United States Patent
Lehmann et al.

(10) Patent No.: US 8,498,953 B2
(45) Date of Patent: Jul. 30, 2013

(54) METHOD FOR ALLOCATING TRIP SHARING

(75) Inventors: Jens Lehmann, Walldorf (DE); David Sommer, Walldorf (DE)

(73) Assignee: Sap AG, Walldorf (DE)

( * ) Notice: Subject to any disclaimer, the term of this patent is extended or adjusted under 35 U.S.C. 154(b) by 457 days.

(21) Appl. No.: 12/750,407

(22) Filed: Mar. 30, 2010

(65) Prior Publication Data

US 2011/0246404 A1    Oct. 6, 2011

(51) Int. Cl.
G06E 1/00 (2006.01)
G06E 3/00 (2006.01)
G06F 15/18 (2006.01)
G06G 7/00 (2006.01)

(52) U.S. Cl.
USPC .......................... 706/21; 705/7.12

(58) Field of Classification Search
USPC .......................... 706/21; 705/7.12
See application file for complete search history.

(56) References Cited

U.S. PATENT DOCUMENTS

| | | | |
|---|---|---|---|
| 6,584,401 B2 * | 6/2003 | Kirshenbaum et al. | 701/521 |
| 6,944,533 B2 * | 9/2005 | Kozak et al. | 701/540 |
| 7,080,019 B1 * | 7/2006 | Hurzeler | 705/6 |
| 7,082,364 B2 * | 7/2006 | Adamczyk | 701/485 |
| 2004/0049424 A1 * | 3/2004 | Murray et al. | 705/14 |
| 2004/0158483 A1 * | 8/2004 | Lecouturier | 705/6 |
| 2006/0155460 A1 * | 7/2006 | Raney | 701/207 |
| 2006/0276960 A1 * | 12/2006 | Adamczyk et al. | 701/201 |
| 2006/0278449 A1 * | 12/2006 | Torre-Bueno | 180/65.2 |
| 2009/0030885 A1 * | 1/2009 | DePasquale et al. | 707/3 |
| 2009/0049044 A1 * | 2/2009 | Mitchell | 707/6 |
| 2009/0248587 A1 * | 10/2009 | Van Buskirk | 705/80 |
| 2010/0114626 A1 * | 5/2010 | Piccinini et al. | 705/7 |
| 2010/0312464 A1 * | 12/2010 | Fitzgerald et al. | 701/200 |
| 2010/0332242 A1 * | 12/2010 | Kamar et al. | 705/1.1 |
| 2011/0145089 A1 * | 6/2011 | Khunger et al. | 705/26.4 |

\* cited by examiner

*Primary Examiner* — Jeffrey A Gaffin
*Assistant Examiner* — James F Sugent
(74) *Attorney, Agent, or Firm* — Kenyon & Kenyon LLP

(57) ABSTRACT

A method and system for allocating users as trip accompanies provides for: creating a first trip prediction algorithm, collecting input parameters, predicting by the first trip prediction algorithm using the collected input parameters as input, at least one first trip, executing a matching method, the matching method comparing attributes of the predicted at least one first trip with attributes of at least one second trip, and allocating the first and the second user to each other as trip accompanies in dependence of the matching score of the first and second potential trip data object.

20 Claims, 9 Drawing Sheets

METHOD FOR ALLOCATING TRIP SHARING

FIELD OF THE INVENTION

The present invention relates to the field of data processing, and more particularly to a computer implemented method for predicting, based on a set of parameters, future trips and a series of trips method for allocating users as trip accompanies.

BACKGROUND AND RELATED ART

Trip sharing, also known as 'ride sharing', is a model of driving cars where people share a car for a specific trip to reduce costs, traffic congestion and environmental pollution.

A considerable disadvantage of existing trip sharing services is that the entry of trip parameters such as starting time and place and the destination of the trip is a tedious and time consuming task. According to state of the art systems, the user has to register as a user of a trip sharing service, log into the trip sharing system, e.g. via an Internet portal, and specify at least the starting time and place as well as the destination of a planned trip. The log-in process and the entry of the trip data takes time and is a considerable obstacle for the usage of trip sharing services for short trips such as the trip from home to work and back executed by commuters on a daily basis. All in all, it may take up to 10 minutes or longer to boot the computer, open an Internet connection, log into the trip sharing service and to specify a planned trip in order to notify other participants of the service of the planned trip. Manually searching for other registered users of state-of-the-art trip sharing services who plan a trip with the same or similar input parameters and with the same or similar destination and who in addition match to the user regarding various personality traits such as smoking habits requires additional time: according to state-of-the art trip sharing services, registered users have to log into the trip sharing service and search for a potential trip accompany having similar trip plans and a congruent personality traits and characteristics. In case of a successful search, they have to make an appointment with the potential trip accompany, e.g. by sending e-mails or making a phone call Depending on various factors, e.g. the availability and readiness to reply, this process can take in sum more than an hour and may require a considerable time buffer of more than a day ahead of a planned trip. This time does usually not pay off for short trips of 10 to 20 minutes which is a common trip length for commuters. Therefore, many commuters abstain from using state-of-the-art trip sharing services for their daily trips from home to work and back. According to environmental considerations, this effect is detrimental, as the traffic produced by commuters makes up a large fraction of the total traffic.

A further common problem of state-of-the-art trip sharing services making said services less attractive to users is the fact that in many regions far more passengers than drivers are registered.

SUMMARY OF THE INVENTION

The present invention relates to the field of data processing, and more particularly to a computer implemented method for automatically predicting, based on a set of input parameters, a future trip. Embodiments of the present invention allow the automated or semi-automated submission of a service request to a trip sharing service, the service request corresponding to a future trip having been predicted with high accuracy and high probability of occurrence by a trip prediction algorithm. The term 'algorithm' will in the following be used in a broad sense as a computational procedure for solving a problem. The automated prediction of the future trip in combination with the automated or semi-automated submission of the specifications of the predicted trip to the trip sharing service significantly reduces the number of man-machine interactions required to specify a planned trip and to notify other subscribed users of said trip sharing service of the planned trip. By facilitating the specification of planned trips by means of automatically predicting a trip based on a set of input parameters by a trip prediction algorithm, the fraction of planned trips being communicated by a user to a trip sharing service is increased and available capacities of free car seats can be allocated to passengers more efficiently. In a fact, fewer cars are needed to transport the same number of persons. The trip prediction algorithm is operable to user-specifically predict a future trip of a user. The trip prediction algorithm is created based on data contained in a trip history of a user.

The input parameters used by the trip prediction algorithm comprise at least the current time and date, but may also comprise additional input parameters which help to increase the accuracy of the trip prediction. A predicted trip comprises at least information on the starting time, starting date, starting place and the destination of the trip. In case the trip prediction algorithm is executed on a portable processing device comprising means to determine its current position, e.g. a navigation device comprising a GPS antenna, the prediction algorithm according to embodiments of the invention is operable to use the determined current position as additional input parameter. According to said embodiments, the received current position can significantly increase the accuracy of the prediction algorithm, because trips predicted to start immediately or in the near future necessarily have the current location of the processing device as starting place of the trip predicted to start immediately.

In a further aspect, the present invention provides a trip series pattern recognition method for automatically and user-specifically predicting series of trips based on a second set of input parameters. The trip series pattern recognition algorithm is created based on data contained in a trip history of a user. The trip series pattern recognition input parameters may overlap or be identical to the set of input parameters used by the trip prediction algorithm. The trip series pattern recognition input parameters used by the trip series pattern recognition algorithm comprise at least the current time and date, but may also comprise additional input parameters which help to increase the accuracy of the trip series prediction. The prediction of trip series is advantageous, as it helps to allocate trip accompanies to each other not only for one single trip but preferentially for series of trips. As the personal acquaintance of trip accompanies with each other is an important motivation for sharing a trip with another person, said feature also helps to increase the efficiency of allocating users to each other as trip accompanies.

In still a further aspect, the method for allocating trip accompanies is further improved by dynamically assigning driver and passenger roles to users having been allocated to each other as trip accompanies for a planned trip, wherein the assignment of driver and passenger roles to the user depends on the distribution of driver and passenger roles in specific geographic regions. Again, said feature helps to neutralize negative effects of unequal regional distributions of driver and passenger preferences of the users of the trip sharing service.

According to preferred embodiments of the invention, a computer implemented method for predicting the destination of a first trip of a first user from a trip history is provided. A trip history is a set of trip data objects, wherein each trip data object represents a past trip.

A data object is a data entity that can be uniquely identified and be manipulated by the commands of a programming language. A trip data object is a data object stored to a storage medium, e.g. a database, or held in memory of a processing device, which comprises data characterizing details of a trip. According to embodiments of the invention, trip related parameters, e.g. the time, date and place of departure and the destination constitute a trip data object.

A trip data object of a trip history is a trip data object representing a trip in the 'real world' which has been executed by a user in the past. A trip data object of a trip history comprises at least the actual starting time, date and place and the actual destination of the past trip.

The trip history of the first user is used as data source based on which the trip prediction algorithm is created. In case the trip prediction algorithm is a machine learning algorithm, the trip prediction algorithm is created by training the algorithm on a trip history of a user. The trip prediction algorithm predicts, given a set of input parameters, at least one planned trip a user will execute in the future. As the trip prediction algorithm is created based on user-specific trip data stored in the user's trip history, the trip prediction algorithm is also user-specific. Data object representing past trips of a first user or stored to a first history and used as data source for the creation of a first trip prediction algorithm, the first trip prediction algorithm being operable to predict planned trips specifically for the first user.

According to some embodiments of the invention, the first trip prediction algorithm is a learning algorithm, e.g. a supervised learning algorithm trained on the first trip history of a first user.

According to other embodiments of the invention, the first trip prediction algorithm is based on statistical calculations executed on the data stored in a first trip history of a first user.

The Trip Prediction Algorithm

At first, a first set of input parameters are received by the processing device, the input parameters comprising at least the current time and date. The current time and date may be entered explicitly by the first user or may be determined automatically by the first processing device, e.g. at the moment when the user turns on the processing device or starts the trip prediction program. For example, a processing device comprising a clock can determine the current date and time automatically.

A processing device comprising means to determine the current position, such as GPS navigation device, is in addition operable to automatically determine the current position.

Processing devices comprising one or multiple physical and logical interfaces to receive external data such as current weather data, current traffic announcements or service messages of various points of interest (POIs) such as gas stations, hotels, restaurants or leisure facilities are in addition operable to automatically receive one or multiple items of said current external data. The received external data can be used as additional input parameters by the trip prediction algorithm.

The term 'interface' as used herein subsumes all components, hardware—as well as software based, necessary to establish a physical and logical connection with an external data provider and to exchange data with said provider. Data exchange on the physical level refers to the exchange of data, e.g. the submission of a service request, via a network. The network connection can be established e.g. via a mobile internet connection based on UMTS, W-LAN, Bluetooth or any other communication standard and technology connecting two or more processing systems with each other. A logical interface guarantees that the request to a service is submitted in a format interpretable by the service and guarantees that the result returned by the called service can be received and correctly interpreted by the client device. A mobile network card may provide access to the internet on a physical level while the installation of appropriate client programs on the processing device provide the ability to interpret the information requested and received from the remote service.

Processing devices comprising one or multiple logical interfaces for application data are operable to receive the current application data and use the received application data as additional input parameter for the trip prediction algorithm. Received application data can be, for example, the starting time, date and place as well as the destination of trip events stored to an electronic calendar of a calendar application, the calendar application having been installed on the same processing device as the trip prediction algorithm or on another processing device being operable to exchange data with said processing device. Depending on the embodiment of the invention, the connection can be a Bluetooth connection, an Internet connection via a WLAN adapter, an Ethernet card, satellite phone card adapter or the like. The receipt of a specified event in the electronic calendar of a user can act as an important and reliable indicator of a future trip of the user of the calendar application.

Processing devices comprising one or multiple logical and physical interfaces for receiving vehicle data are operable to receive and use vehicle data as additional input parameters for the trip prediction algorithm. Vehicle data being indicative of a planned trip of the user can be, for example, the number and position of occupied seats in a car, or the filling level of the gas tank or oil tank of a car. The processing device according to that use case scenario may be a navigation device built into or connected to a car.

The set of input parameters of the trip prediction algorithm comprises at least the current time and date. Depending on the embodiment of the invention, in particular on the logical and physical interfaces comprised by the processing device, additional data such as vehicle data, application data, the current location of the processing device or external data may be used as additional input parameters to increase their prediction accuracy of the trip prediction algorithm.

Predicted or manually specified trips that have been executed are stored afterwards to the trip history of a user. The minimum data each trip data object comprises as its starting time and date, its starting place and its destination. In case additional parameters such as external data, vehicle data, or application data were available at the start of the trip, those additional parameter are also stored as additional trip data object executes to the trip history and are used as additional input features during the creation of the trip prediction algorithm based on the trip history of the user. A machine learning based trip prediction algorithm, for example, uses trip data object attributes as additional features during training to increase the prediction accuracy of the trip prediction algorithm.

The collected set of input parameters is used as input for a first trip prediction algorithm being specific for a first user. Said first trip prediction algorithm has been created based on the data contained in all trip data objects stored in the first trip history. The first trip prediction algorithm is operable to predict the destination the first user will chose given a set of input parameters.

After having received the set of input parameters, the first trip prediction algorithm predicts at least one planned trip of the first user. For each predicted trip, the first trip prediction algorithm calculates a prediction score. According to embodiments of the invention, said prediction score is a derivative of the accuracy of the first trip prediction algorithm and a calculated probability value being indicative of the probability that the first user will indeed execute the predicted trip. The accuracy of the first prediction destination algorithm depends on the size of first trip history used to train or generate the first trip prediction algorithm. The higher the number of trip data objects in the trip history, the higher the accuracy of the trip prediction algorithm having been trained on or created from that trip history data.

The combination of the accuracy value and the probability value is advantageous, as it prohibits a high prediction score in case the data basis used for prediction is scarce. In case the first trip history comprises only a small set of trip data objects, the accuracy of the first trip prediction algorithm is small as the data basis used for predicting the destination chosen by a particular user is too small to allow a reliable, highly accurate prediction. In case all the trips in the first trip history have the same set of input parameters as the currently collected set of input parameters, the probability value for said destination will be 100% or close to 100%. The accuracy value, however, will be low in said example, resulting in a low prediction score.

According to embodiments of the invention according to which a small set of users rather than a single user uses a processing device in a mutual exclusive manner, the data storage of the processing device may in addition to the first trip history of the first user comprise at least a second trip history of at least a second user. According to said embodiments, at least a second trip prediction algorithm exists having been trained based on or generated from the second trip history. For example, if a processing device is a navigation device built into a car, the car being used by different persons, each user has to log into the processing device or into the trip prediction algorithm.

Machine Learning Based Trip Prediction Algorithm

According to embodiments of the invention, the first trip prediction algorithm is implemented as feed forward backpropagation neural network, in particular a multilayer perceptron (MLP). The term 'feed forward' means that data flows in one direction from the input layer to the output layer. The network is trained with the backpropagation learning algorithm. Multilayer perceptrons can solve problems which are not linearly separable. According to further embodiments of the invention, genetic algorithms or other machine-learning approaches such as SVMs, Bayesian statistics, decision trees or other learning algorithms are applied to predict trips a user will probably chose in the future.

According to further embodiments, of the invention, the prediction of future trips is based on the application of rules.

The task a neural network according to embodiments of the invention has to solve is the task of predicting the trip a user will chose given a set of input parameters.

According to embodiments of the invention wherein the trip prediction algorithm is implemented as neural network, each input parameter is used as input in the input layer of the neural network, wherein a set of 'known trips' determines the set of possible distinct classification results of the neural network.

According to some embodiments of the invention, the set of 'known trips' comprises the set of all trips contained in a user's trip history. As the date and time of the trip data objects of the trip history lie in the past, the set of known trips does not comprise the precise time and date of said past trips, but rather 'generalized' time attributes which will occur again in the future, such as a particular time of day, a particular weekday, the attribute 'Holiday' or 'working day', or the like. A 'known trip' having been derived from a trip data object of a trip history therefore is defined by said abstract time attributes, a starting place and a destination.

According to further embodiments of the invention, the set of 'known trips' further comprises trips having been extracted from the electronic calendar of a calendar application of the user for whom the trip prediction is executed.

The neural network predicting a destination for a user is trained on the trip history of said user. As a result, the neural network is operable to predict the most probable destination chosen by a user given a particular set of input parameters. Each input parameter comprises a weight depending on its type. The weighted input parameters of all trip data objects of the trip history are used as input for training the neural network. As a result of training, the neural network predicts a future trip by selecting one particular trip from a set of known trips, wherein the starting time and date are projected into the future. For example, if the neural network has learned that the user always drives from home to work on Monday mornings, and the trip prediction algorithm is executed on Saturday, then the trip prediction algorithm will predict the future trip to happen next Monday starting from home and having the destination 'work'. The set of known trips therefore comprises the set of associated starting places and destinations of all trips stored in the trip history.

According to further embodiments, the set of known trips further comprises pairs of starting places and destinations specified in a calendar application having been installed on the processing device of a user or another processing device connected to said processing device. Data stored in the electronic calendar of said calendar application is read by the trip prediction algorithm having been installed on said processing device of the user. For example, if the electronic calendar of the calendar application comprises a first business appointment in town A and that second business appointment in town B on the same day three hours later, the set of known trips may also comprise a known trip derived from the electronic calendar of the calendar application, said known trip comprising town A as starting place and town B as destination.

During the learning process of the neural network, the weights of the input parameters are adapted in each layer of the network by a back-propagation algorithm to minimize a mean squared error value. The mean squared error value is an indicator of the prediction accuracy of the trip prediction algorithm. To 'train' a back-propagation neural network implies to propagate backwards through the network an error value indicating the difference between the observed value (the actual destination chosen by the user) and a predicted value (the predicted destination given a set of input parameters). Upon back-propagation of the error, changes are made to the weights of the input parameters in each layer, wherein the weight changes are calculated to reduce the error signal for the destination prediction. The mean square error value of a network is indicative of the prediction accuracy of a neuronal network and is reduced upon each new entry of a trip data object provided that the traveling behavior revealed in those trip data objects follows at least in parts a regular pattern and is not completely random. In case the traveling behavior starts to deviate from a previously established behavioral pattern, e.g. by a change of the working place, the mean square error signal may temporarily increase by adding new trip data objects for the new trips from home to work.

For example, the first trip history of the first user comprises 20 trip data object representing past trips of the first user. A 21st trip data object may then be added to the trip history.

Adding of the additional trip data object may be executed by an explicit specification of input parameters and the destination by the user. Alternatively, or in addition, the adding of the additional trip data object to the first trip history may be executed by a calendar application related program being operable to extract data from the Electronics calendar of a user, thereby automatically or upon approval by the user specifying a new trip data object. Alternatively, or in addition, the new trip data object is added automatically by the processing device after having reached the destination of a trip chosen by the user. In order to be operable to add past trip data objects to the trip history automatically, the processing device needs to comprise a means to determine its current position, e.g. a GPS antenna, the processing device as a result being operable to determine the input parameters (starting time, date and starting point) and the destination automatically.

The neuronal network predicts the 21st trip by applying the trip prediction algorithm having been trained on 20 trip data objects on the input parameters of the 21st trip. After the user has finished the 21st trip or has explicitly specified the destination of the 21st trip, the actual starting place and destination of the trip are known. The trip prediction algorithm based on the neural network then compares the predicted trip with the actual 21st trip and adopts the weights of its layers during the execution of the backpropagation algorithm such that the mean squared error value is minimized. As a result, by taking into consideration also the data comprised in the 21st trip data object, the accuracy of the destination prediction by the neural network has improved.

The determination of the accuracy of the trip prediction algorithm depends on the machine learning approach applied. According to embodiments of the invention whose trip prediction algorithm is based on neural networks, the accuracy of the trip prediction algorithm is determined as the size of a mean-square error signal retrieved by comparing a predicted destination with the actual destination of a trip. The accuracy value of the prediction algorithm in combination with a probability value for a predicted destination is used by embodiments of the present invention to determine a prediction score.

Contrary to the machine learning based approaches, e.g. the neural network based approach described in the previous section, a statistics based approach according to the present invention is a trip prediction approach based solely on statistical calculations, wherein the prediction algorithm does not necessarily have to change after each re-training on the actual trip history of a user. The details of some embodiments of the invention using a statistics approach can be found in the description of FIG. 10.

In a first step, for each 'known trip' and each input parameter gathered, a probability is calculated indicating the probability that a particular trip is chosen by a user given a set of input parameters or parameter ranges, e.g. a particular weather, a particular time and date, a particular vehicle status code etc. The probability value for a particular trip T1 given a particular input parameter set comprising e.g. a starting time 7.44 a.m. can be calculated as the fraction of all trip data objects having the starting place and departure of T1 and starting within a time range of e.g. 7.30 a.m. and 8.00 a.m.

In case multiple input parameters of multiple types are available for predicting future trips, e.g. the starting place, external data or application data, then the probability value that a user chooses a particular trip T1 is calculated for each input parameter P of all trip data objects of the trip history of a user having the same starting time, starting day in the week, the same starting place and destination as the trip T1. The calculated probability values can be normalized in a subsequent step based on the type of the parameter involved. For example, weather data may be considered as a weaker predictor than the current time. The weather data at the start of a trip may therefore be assigned a lower weight than the time information.

For each known trip, a total probability value is calculated given the set of input parameters. The predicted trip with the highest probability value is returned as prediction result.

A detailed example for one statistics based trip prediction algorithm is explained in the description of FIG. 10.

Input Parameter Types: Examples

A driver according to one embodiment of the invention may have to choose between two different supermarkets to do the weekly shopping. The route to the second supermarket is about 10 minutes longer than the route to the first supermarket. The user therefore always chooses the first supermarket. Once the route to the first supermarket was clogged by a traffic jam, said information was indicated to the user at trip start as a traffic announcement received from an external, remote traffic announcement service. After having received the announcement, the user at that time chose to drive to the second supermarket. The user's decision as well as the external data the decision was dependent from was stored as trip data object to the trip history of the user. The trip prediction algorithm, having been created based on the data in the trip history comprising also additional, external input parameters, learned during training on said trip history that the user drives to the first supermarket every Saturday morning provided there does not exist a traffic announcement indicating a traffic jam on the route to the first supermarket. In case such a traffic announcement exists, the trip prediction algorithm will predict the second supermarket to be the destination chosen by the user on a Saturday morning. The traffic announcements may be provided to the processing device of the user via a SOAP based web service interface or any other communication protocol appropriate to transmit relevant external data and being accessible by the processing device via an interface.

A further example of external data which may be used as input parameters by the trip prediction algorithm is weather data. A user who regularly drives to a lake in case of sunny weather in the summer may choose another leisure facility in case of rainy weather.

According to further embodiments of the invention, processing devices running the trip prediction algorithm comprise an interface for receiving error or status messages from a vehicle. Said error or status messages received from the vehicle are used as additional input parameters by the trip prediction algorithm. The received vehicle data can comprise the number and position of the car seats, the filling level of the gas tank, or the like.

For example, a person may use his car to drive to work (the driver's seat occupied), to do the weekly shopping (the driver's and the co-driver's seat occupied) and to occasionally bring his child to kindergarten (the driver's and the left rear seat occupied). Information on the number and the position of the occupied seats can be a very good predictor of the trip a driver plans to execute. A trip prediction algorithm being operable to receive that data from the vehicle and use the received data as additional input parameter has therefore a particularly high accuracy.

According to another example, the filling level of the gas tank of a vehicle can be a good predictor whether a user will drive to a gas station or to a supermarket in the next town.

According to further embodiments of the invention, the accuracy of the trip prediction can further be enhanced by receiving, via one or multiple additional interfaces, application data provided by one or multiple applications running on the processing device or another processing device being connected to the processing device running the trip prediction algorithm. In particular, event data objects contained in the electronic calendars of calendar applications characterized by a particular starting time, date and location can be used as input for the trip prediction algorithm. In order to use application data as input parameters for the trip prediction algorithm, the trip prediction algorithm must comprise an interface for receiving data from such an application, e.g. a calendar application. The received calendar application data, e.g. the starting time, the date and the location of events in the electronic calendar, is used as additional input of the trip prediction algorithm to predict planned trips.

Whenever a trip is executed in 'real life' by a user, additional input parameters received from external data sources, from a vehicle and/or from an application are collected and stored in association with the trip data object representing the actual trip in the trip history of the first user. According to embodiments of the invention, the collection of input data is therefore executed at least twice: once for collecting input parameters for the trip prediction algorithm and once at the actual start of a trip in order to store the collected data in association with the trip data object representing said trip in a trip history, thereby providing the data basis used to create or re-train the trip prediction algorithm. By training or re-training an existing machine learning algorithm of a user on his trip history, the prediction accuracy of the trip prediction algorithm increases over time provided said user does not show a random or completely unsteady traveling behavior.

Trip Series Pattern Recognition Algorithm (TSPR Algorithm)

According to further embodiments of the invention, the processing device running the trip prediction algorithm in addition comprises computer-interpretable instructions for the execution of a trip series pattern recognition algorithm, in the following referred to as TSPR algorithm. The TSPR algorithm detects patterns of regularly executed trips based on the trip history of a user and user-specifically predicts future trip series.

A trip series is set of two or more subsequent trips, the set of subsequent trips being executed repeatedly by a user according to a constant pattern. For example, a first user may commute to work and back on every Monday, Tuesday, Thursday and Friday. On Wednesdays, the first user does not have to work and usually visits different leisure facilities such as a tennis club or a movie theatre, or goes shopping. Because the leisure facilities are not visited according to a constant pattern by the first user, a trip prediction algorithm generated from the first user's trip history cannot predict the destination of a trip executed by the first user on Wednesdays. The trips from home to work and back, however, may follow a regular pattern and are therefore predictable by the TSPR algorithm.

In a first step, a TSPR algorithm is applied on a first trip history to detect patterns of regularly executed trips of a first user whose past trips are represented by trip data objects stored in the first trip history.

In a second step, the TSPR algorithm having been trained on the trip history of the first user can be used to predict future trip series by inputting a set of TSPR input parameters.

In a third step, future trips belonging to at least one predicted trip series can be used by a trip sharing service to execute a matching method to find other registered users of the trip sharing service having identical or similar trip plans and to automatically allocate matching users to each others as trip accompanies.

According to embodiments of the invention, the TSPR algorithm is implemented as self organizing map algorithm. According to further embodiments of the invention, said TSPR algorithm may likewise be implemented as Naive Bayesian algorithm, neural network, Markov chain, hidden Markov model (HMM), autoregressive moving average model (ARMA models) or another algorithm being able to recognize trip series patterns from a set of trip data objects, each trip data object comprising at least information on the starting time and place and the destination of the represented trip.

According to further embodiments of the invention, the prediction of future trips series is based on the application of rules.

According to some embodiments of the invention, the TSPR algorithm uses additional input parameters of the trip data objects of the trip history of a user, e.g. external data, vehicle data or application data, to increase the accuracy of the pattern recognition algorithm. The execution of the TSPR algorithm can be triggered automatically by the processing device according to a fixed schedule, or may be called explicitly by a user.

According to preferred embodiments of the invention, the TSPR algorithm is operable to assign each predicted trip series a trip series prediction score value, in the following referred to as TSPR score value.

According to preferred embodiments of the invention, the TSPR score value is a derivative of the accuracy of the TSPR algorithm and the predicted probability that a particular trip series will be executed by a user given a set of input parameters, in particular a current time and date. The TSPR algorithm assigns each predicted trip series a TSPR score value and returns only those predicted trip series as a result having a TSPR score value above a first TSPR score threshold value.

As a trip series is defined as a set of subsequent trips, an overlap of starting time and arrival time of two or more trips in the same trip series is not possible. The subsequent trips may immediately follow each other or may be separated from each other by an interim time interval of several minutes, hours or days.

According to further embodiments of the invention, the TSPR score value of the predicted trip series further depends on the starting time of the earliest starting future trip belonging to a predicted trip series and on the question whether a trip series is a sub-series of another predicted trip series. Given a set of TSPR input parameters and a set of trip series predicted thereupon having a TSPR score above the first TSPR score threshold value, that trip series comprising a predicted future trip with the earliest starting time is referred to as 'earliest trip series'. The earliest trip series is assigned a higher score value than trip series having a prediction score value above said TSPR score threshold value and starting later in time. In case a first trip series comprises all trips of a second trip series and comprises in addition at least one further predicted trip, the second trip series is a sub-series of the first trip series. The score value of said sub-series is reduced, ensuring that only said first trip series is returned as a result. In case multiple predicted trip series have the same first trip element and therefore start at the same point in time, the TSPR algorithm returns that trip series covering the largest number of predicted trips. In other words, the TSPR algorithm does not return a sub-series in case a larger series covering said sub-series and beginning at the same time was determined by the TSPR algorithm. According to said embodiments of the invention, only the trip series with the highest TSPR score value is returned as result.

In case some predicted trips of a predicted trip series lie in the past, only the set of predicted trips lying in the future are returned as result. For example, if a trip series comprising 8 trips from home to work and back were determined for all Mondays, Tuesdays, Thursdays and Fridays, the TSPR algorithm will return a predicted trip series comprising only 4 trips from home to work and back if executed on Wednesday as the trips executed on Monday and Tuesday of the current week already lie in the past.

By automatically predicting future trips and trip series having a high prediction/TSPR score value, embodiments of the invention allow the automated submission of a notification of one or multiple planned trips by a user to a trip sharing service. The number of manually executed steps for specifying and submitting future trips to trip sharing service that thereby greatly reduced, the number of trips announced to a trip sharing service is increased and the number of empty car seats allocated to other registered users of said trip sharing service is increased.

Type I and Type II Processing Devices

Multiple embodiments of the invention comprising the trip prediction algorithm based on trip history data of a user which may in addition comprise a TSPR algorithm having also been trained on the trip history of a user exist. Two main types of embodiments can be distinguished according to their processing device on which the trip prediction algorithm and the TSPR algorithm are installed.

Type I Processing Devices

The first type of processing device hosting the trip prediction algorithm and according to further embodiments also the TSPR algorithm are trip sharing service client devices belonging to a single or a small set of users, e.g. mobile phones, notebooks, notebooks, a desktop computer, smart phones, navigation devices and the like. A processing device of type I will in the following be referred to as 'client device'. Said client device is operable to submit trip sharing service requests to a remote server hosting a trip sharing service via a network, e.g. the Internet. A client device therefore also comprises an interface for physically establishing a network connection to the server hosting the trip sharing service and a further interface for logically exchanging data with said trip sharing service. The physical interface may be an Ethernet card, a satellite receiver for mobile Internet, a WLAN adaptor, means for sending and receiving SMS or for exchanging meeting request e-mails and meeting request response e-mails with the trip sharing service. Type I processing devices comprise a data storage having stored the trip history data of the user of said processing device. Typically, the processing device belongs to one single user. According to some embodiments of the invention, the type I processing device is used by a small number of different users. In case the processing device is an inbuilt navigation device of a car, there may be more than one person using that car and that navigation device, for example. According to said use case scenario, the user is provided with means to log into an application providing the destination prediction and in some embodiments also the TSPR prediction functionality by creating the trip prediction algorithm/training the TSPR algorithm selectively on the trip history of the logged-in user.

Type II Processing Devices

Type II processing devices corresponding to the second type of embodiments of the present invention are processing devices, preferentially servers, hosting a trip sharing service. The trip sharing service has access to a 'global trip history'.

The global trip history is a trip history comprising the trip history of all registered users of the trip sharing service. Each trip history of a registered user comprises trip data objects representing past trips of said user. The global trip history comprises at least a first trip history of a first user and a second trip history of a second user. For each registered user of the trip sharing service a user-specific trip prediction algorithm is generated based on the trip history of each registered user. A type II processing device comprises a physical interface for connecting the processing device to a network, e.g. the Internet, and at least one logical interface for receiving trip sharing service request from clients and for returning the sites in response to the receipt of the trip sharing request. The physical and logical interfaces of the type II processing device comprise interfaces for receiving trip service requests submitted from various type I processing devices (client devices) via E-Mail, SMS, Http requests, XML/SOAP based requests, etc.

The user-specific trip prediction and trip series prediction based on the data contained in a user's trip history can likewise be executed on type I processing devices/trip sharing service clients and type II processing devices/trip sharing server. In each case, the execution of the trip prediction algorithm and the TSPR algorithm can be executed on a regular basis according to a fixed time schedule, or upon explicit request by a registered user of the trip sharing service. In addition, for type II processing devices, the operator of the trip sharing service may explicitly initiate the execution of the trip prediction algorithm and the TSPR algorithm globally for all registered users of the trip sharing service.

Executing the Trip Prediction or TSPR Algorithm on a Type I Processing Device:

Given a set of input parameters, the input parameters including at least the current time and date, the trip prediction algorithm installed on the processing device of a first user predicts at least one future trip. Depending on the embodiment of the invention, the attributes of the trip data objects having been used during the creation or training of the trip prediction algorithm and during the training of the TSPR algorithm may vary and can comprise in addition to the current time and date:

the current place in case the type I processing device of the first user comprises means to determine its current position e.g. a GPS antenna.

External data such as weather data, traffic announcement, pricing or service announcement of various points of interest (POIs) in case the processing device comprises at least one interface to request and receive external data, vehicle data of a vehicle of the first user, e.g. the number and position of occupied car seats, the filling level of the gas tank or oil tank, status or error message codes of the vehicle, in case the type I processing device comprises at least one interface for requesting and receiving said vehicle data, application data of additional applications, in particular calendar applications comprising in their electronic calendar event related data, such as the time and location of business meetings or private appointments, in case the type I processing device comprises at least one interface for requesting and receiving said application data.

The input parameters collected as input for the trip predicting or TSPR algorithm vary likewise depending on the interfaces available for a particular type I processing device.

In a first step, the trip prediction algorithm gathers input parameters available at a particular moment in time and predicts future trips of the user.

For example, if a user regularly drives to work on Monday morning and the trip prediction algorithm determines that it is 7.30 a.m. and a Monday, the trip prediction algorithm will predict a trip from home to work having assigned a high prediction score value, the predicted trip comprising at least a starting time and date, a starting place (home) and a destination (work).

The execution of the trip prediction algorithm may be triggered explicitly by the user of the type I processing device or may be executed automatically on a regular basis for said user.

The execution of the TSPR algorithm is triggered in the same way as the trip prediction algorithm. Depending on the implementation of the TSPR algorithm, the TSPR input parameters are identical to the input parameters used by the destination prediction algorithm or comprise a different selection of external data, application data, vehicle data and current location data.

Executing the Trip Prediction or TSPR Algorithm on a Type II Processing Device:

Contrary to the type I processing device, a trip sharing server comprises in the data storage the global trip history comprising the trip history of all registered users of the trip sharing service. The trip history of each user comprises trip data objects representing past trip events.

Each executed user-specific trip prediction algorithm at first collects a set of input parameters, the input parameters including at least the current time and date, the trip prediction algorithm installed on a type II processing device predicts at least one future trip of at least one registered user. The execution of the trip prediction algorithm may be triggered explicitly by a registered user for predicting his future trips, may be executed automatically on a regular basis for all registered users or may be explicitly triggered for a selected set of users or all users by the operator of the trip sharing service.

The execution of the TSPR algorithm is triggered in the same way as the trip prediction algorithm. Depending on the implementation of the TSPR algorithm, the TSPR input parameters are identical to the input parameters used by the destination prediction algorithm or comprise a different selection of external data, application data, vehicle data and current location data.

Depending on the embodiment of the invention, the input parameters of the trip data objects having been used during the creation or training of the trip prediction algorithm or TSPR algorithm may vary depending on the data provided by the registered user for each trip data object representing a formerly 'planned' trip which was later on stored as 'past trip' to the trip history of a user. Depending on the trip specifications obtained from the registered users, the creation of the destination prediction algorithm or the TSPR algorithm may comprise:

the starting place of a past trip,
external data such as weather data, traffic announcement, pricing or service announcement of various points of interest (POIs) having been received by a type I processing device or the type II processing device at the moment of the start of the trip,
vehicle data of a vehicle of the first user, e.g. the number and position of occupied car seats, the filling level of the gas tank or oil tank, status or error message codes of the vehicle, in case the type I processing device comprised at least one interface for requesting and receiving said vehicle data and submitted the gathered information to the trip sharing service,
application data of additional applications, in particular calendar applications comprising in their electronic calendar event related data, such as the time and location of business meetings or private appointments, in case the type I processing device comprised at least one interface for requesting and receiving said application data and submitted the gathered information to the trip sharing service.

Input parameters which are collected for predicting a future trip or a future trip series can comprise in addition to the current time and date external data in case the type II processing device comprises an interface to request and receive external data.

In general, the higher the number of input parameters used for a prediction of a trip or trip series, the higher the accuracy of the prediction.

Creating Potential Trip Data Objects by a Trip Sharing Service

The trip prediction algorithm is operable to user-specifically predict, given a set of input parameters, at least one future trip which may or may not belong to a trip series. In case the prediction score of a predicted future trip is above a prediction score threshold value, said predicted trip is returned by the trip prediction algorithm as a result.

The trip TSPR algorithm is operable to user-specifically predict at least one future trip series given a set of TSPR input parameters. In case the TSPR prediction score of said at least one predicted trip series has assigned a TSPR score value being higher than a first TSPR score threshold value, at least one predicted trip series is returned as a result, the returned trip series comprising at least one predicted future trip. The prediction of future trips based on the TSPR algorithm comprises at least the steps of training the TSPR algorithm on a user's trip history, extracting trip series patterns from the trip history, and determining, after having received a set of TSPR input parameters, if one or more of said extracted trip series will be executed by the user in the future, e.g. within a predefined time interval of one month or one week, or is currently executed, wherein at least some of the trips of the currently executed trip series start in the future. If such a trip series is detected and has a sufficiently high TSPR score value, the future trips belonging to the predicted trip series are considered as predicted trips and treated in the following in the same way as the future trips predicted by the trip prediction algorithm.

In the following, processing steps will be described transforming a data object comprising at least the starting time and date, the starting place and the destination of a trip, in the following referred to as 'predicted trip data object', in a potential trip data object. Each potential trip data object is created by a trip sharing service hosted on a type II processing device. Each created potential trip data object is compared in a matching method against other potential trip data objects of other registered users of a trip sharing service and for allocating users of matching potential trip data objects to each other as trip accompanies.

In case the predicted trip data object was generated by the trip prediction algorithm or the trip series algorithm on a type II processing device hosting a trip sharing service, each predicted trip data object can be directly transformed into a potential trip data object by the trip sharing service. In case the predicted trip data object comprises additional attributes containing e.g. external, application or vehicle data used in the prediction, those additional attributes may in addition be used for the specification of the potential trip data object.

In case a predicted trip data object was created on a type I processing device as a result of the execution of the trip prediction or TSPR algorithm, the predicted trip data object having a prediction score value above an 'automated submission' score threshold value or belonging to a predicted trip series having a TSPR score value above said 'automated submission' score value, a service request is created for each predicted trip data object. The service request comprises at least the starting time, date and starting place and the destination of the predicted trip. The created service request may in addition comprise additional parameters gathered as input parameters for the prediction of the trip or other user-specific parameters. The service request is submitted to the trip sharing service via an interface, e.g. via an E-mail, SMS, web-service interface etc. The created service requests are automatically submitted in case their prediction score value or the TSPR score value of the predicted trip series is above the automated submission threshold value. In case the prediction score value of the predicted trip data object or the TSPR score value of the predicted trip series is equal to or below the automated submission threshold value but above a 'confirmed submission' threshold value, the predicted trip(s) are presented to the user and submitted in the form of service request(s) only upon the confirmation by the user.

The trip sharing service being hosted on a type II processing device receives the service request, extracts the data from the received service requests and creates for each received service request a potential trip data object, the potential trip data object comprising the data of the service request.

Potential trip data objects are trip data objects created by the trip sharing service running on the trip sharing server. Potential trip data objects represent planned trips of registered users of the trip sharing service. The starting time of a trip represented by a potential trip data object starts in the future, a potential trip data object is therefore not part of the trip history and not used for training or generating the trip prediction algorithm. The potential trip data objects are stored to a data storage being accessible by a trip sharing service, the trip sharing service running on a server and comprising user profile of a multitude of registered users of the trip sharing service. A potential trip data object may also be created by a trip sharing service upon the receipt of a service request comprising the specifications of a planned trip having been explicitly entered by a user.

According to preferred embodiments of the invention, the starting time of a predicted trip specified in a service request submitted to the trip sharing server as well as the starting time specified in a potential trip data object represents the earliest acceptable starting time for a user. The earliest acceptable starting time may be equal to the predicted starting time or may begin earlier than the predicted starting time. For example, the user could have specified in his user profile of the trip sharing service a starting time margin which is used by the trip sharing service to automatically determine the earliest acceptable starting time of a user. This feature is advantageous as it helps to increase the efficiency of allocating users as trip accompanies: although the trip prediction and TSPR prediction algorithm may have learned from the trip history that a user commutes to work every weekday morning 7.30 a.m., a starting time margin of 30 minutes results in the creation of a potential trip data object having specified a starting time of 7.00 a.m. As a result, said potential trip data object can successfully be matched with potential trip data objects of other users having specified a starting time of 7.15 a.m. The earliest possible starting time according to said embodiments is calculated as:

predicted starting time−starting time margin=earliest acceptable starting time.

Analogously, provided the user preferences are available at a type I processing device, the earliest acceptable starting time specified in a trip sharing service request submitted to the trip sharing service can be calculated.

According to further embodiments of the invention, the trip data objects in the trip history of a user further comprise the time of arrival at a particular destination. According to said embodiments, the trip prediction algorithm and the TSPR algorithm are operable to predict the arrival time of the predicted trip. The arrival time can be predicted e.g. by calculating the average travel time for a particular trip from a particular starting place to a particular destination and adding said calculated travel time to the predicted starting time of a future trip. The trip sharing service request comprises in addition the predicted arrival time. The potential trip data object created by the trip sharing server upon receiving said service request or upon having executed a trip prediction or TSPR prediction algorithm also comprises a predicted arrival time.

According to some embodiments, the arrival time of a trip sharing service request or a potential trip data object is the predicted arrival time of the predicted future trip. According to further embodiments of the invention, the arrival time of a trip sharing service request or a potential trip data object is the latest acceptable arrival time for the user. The latest acceptable arrival time for a user is calculated by adding an arrival time margin having been specified by the user to the predicted arrival time.

For example, if the predicted arrival time of a trip is 9.a.m. and the arrival time margin specified in the user profile of said user is 20 minutes, then the latest acceptable arrival time for said service request or potential trip data object is 9.20 a.m.

According to further embodiments of the invention, the user may specify the starting time margin and the arrival time margin by entering said parameters into his type I processing device.

Executing a Matching Method by a Trip Sharing Service

In the first step, a first potential trip data object is created by the trip sharing service after the receipt of a service request, the service request being submitted as a result of the execution of the trip prediction or the TSPR prediction algorithm on a type I processing device. Likewise, the potential trip data object may be created by the trip sharing service as a result of the execution of the trip prediction or TSPR algorithm on the type II processing device hosting the trip sharing service.

The following steps are the same irrespective if a predicted future trip was predicted by the trip prediction algorithm or was predicted by the TSPR prediction algorithm and irrespective of the question whether the trip prediction or TSPR prediction algorithm was carried out on a type I or II processing device.

According to preferred embodiments of the invention, each potential trip data object upon creation is in addition assigned features derived from the user profile of the registered user of the trip sharing service for whom the trip represented by the potential trip data object was predicted or created. User profile data comprises, e.g. user-specific preferences regarding their smoking habits, their taste in music, the age, the gender, the maximum detour a user is willing to drive in order to pick up or drop off trip accompanies and the price a user expects to receive in the role as driver or the money a user is willing to pay in the role as passenger. According to preferred embodiments of the invention, the user profile data of a user also comprises data on his preference to act as driver or passenger.

The preference of a user to act as driver or passenger stored in a user's profile is expressed in the form of a scale value ranging from 0 to a maximum value, e.g. 10. According to embodiments of the invention wherein said scale values represent the preference of the user to act as driver, 0 indicates that the user is a categorical passenger. Said user may, for example, not possess a car or a driving license. The maximum value of said scale would indicate that the user insists on acting as driver in any case. Any value larger than zero being in the lower half of the scale value range indicates that the user preferentially acts as passenger wherein a scale value lying in the upper half of the scale value range indicates that the user preferentially acts as driver. A data value being equal to the median scale value of the value range of said scale indicates that the user is likewise willing to act as passenger or as driver.

The data storage of the trip sharing service further comprises at least one second potential trip data object having been created by the trip sharing service after the receipt of a service request of at least one second registered trip sharing service user. Typically, many thousand or hundred thousand potential trip data objects exist in a database of the trip sharing service. After having created the first potential trip data object of a first user, a matching method of the trip sharing service is executed. The matching method compares the first potential trip data object with all existing second trip data objects stored to the data storage of the trip sharing service. Each second potential trip data object comprises at least the starting time and date, the starting point and the destination of a predicted or explicitly specified trip. According to preferred embodiments of the invention, each potential trip data object further comprises user preferences as specified in the user profile of each registered user of the trip sharing service. For each compared pair of the first and a second potential trip data object, a matching score is calculated. The matching score indicates the degree of congruency between the two compared potential trip data objects. The higher the number of matching features of a pair of compared trip data objects, the higher the generated matching score. After having compared the first potential trip data object with all second trip data objects existing in the data storage of the trip sharing service, the matching method returns as a result list of matching second potential trip data objects ordered according to the matching score obtained upon comparison of the first potential trip data object with each second potential trip data object.

According to embodiments of the invention, the potential trip data objects are implemented as multidimensional vectors. Each vector comprises trip related and user-related specifications. Each specification is represented by one dimension of the vector. A vector could for example comprise dimensions representing the place of departure, the starting time, the destination, the maximum price a user is willing to pay as passenger, the minimum expected reward as driver, the user's smoking preferences or the user's preferences regarding the gender of trip accompanies. Each dimension has assigned a weight which corresponds, geometrically, to the length of each vector component. Any vector directed in n dimensions can be thought of as having an influence in n different directions. That is, it can be thought of as having n parts. Each part of an n-dimensional vector is known as a 'component'. The components of a vector depict the influence of that vector in a given direction. Some dimensions can have assigned a high weight while other dimensions such as a taste in music of the trip accompany may have a low weight.

The weight of a dimension determines the impact of each dimension on the overall matching score obtained by comparing the vectors of two potential trip data objects with each other. The similarity of two vectors is determined based on the angle between both vectors within a multidimensional space. The smaller the angle, the more similar are both multidimensional vectors to each other and the higher is the matching score. The weight of a particular dimension determines the impact of that dimension on the matching score of the two compared vectors.

The trip sharing service after having executed the matching method, assigns the user corresponding to the best matching second potential trip data object as trip accompany for the future trip represented by the first potential trip data object as trip accompany. The assignment of the best scoring second user to the first user is executed automatically by the trip sharing service provided the matching score of the first with said second potential trip data object is above an 'automated assignment' threshold of the first user. In case the matching score is equal or below said 'automated assignment' threshold but above a 'confirmed assignment' threshold of the first user, the second user is assigned to the first user upon confirmation by the first user. In any case, the successful allocation of two users as trip accompanies for a particular trip requires the explicit or automatic acceptance of the respective trip accompany by both users.

In case the client device of the first user as well as the trip sharing server hosting and executing the trip prediction algorithm and/or the TSPR algorithm, it may be the case that future trips of a user are predicted twice, once on the client side and once on the server. According to said embodiments of the invention, each potential trip data object is assigned its prediction score value. Said value is set to the maximum value in case the user has specified said potential trip data object explicitly. Potential trip data objects having been successfully matched to other potentially trip data objects of other users are flagged accordingly or moved to a list of successfully established future trips. Two potential trip data objects are matched successfully if they return a matching score being high enough to allow the initiation of an automated or semi-automated allocation of trip accompanies and wherein said allocation of trip accompanies has been successfully completed. The trip sharing service determines, before creating a new potential trip data object, if other potential trip data objects having the same starting time, starting date, starting place, destination and prediction score value and corresponding to the same user already exists. The new potential trip data object is only created if no such potential trip data object exists. In case a future trip was predicted having the same attribute values like an existing potential trip data object of the user except for the prediction score attribute value, said existing potential trip data object is deleted and replaced by the newer version of the potential trip data object, provided said existing trip data object does not correspond to a trip whose assigned trip accompanies already have successfully been allocated to each other.

For example, a trip prediction algorithm may have predicted on Sunday evening a future trip from home to work starting on Monday Morning. As the trip prediction score was over 90 score units, said score value lying above a threshold for automatically submitting service requests, on Sunday evening a corresponding request is submitted to the trip sharing service resulting in a successful allocation of a passenger to said predicted trip. When the user on Monday Morning starts the trip prediction algorithm again, the trip prediction algorithm, upon gathering additional input data, may predict said trip from home to work starting within the next 10 minutes with even a higher prediction score value of 93 score units. As a trip accompany has successfully been allocated to the user for said predicted trip, the newly predicted trip having a prediction score value of 93 units does not overwrite the existing potential trip data object. In case such an allocation would not exist, the existing potential trip data object would have been overwritten.

According to further embodiments of the invention, the matching score of potential trip data objects belonging to users potentially sharing multiple predicted trips is increased:

a third predicted trip belonging to a first predicted trip series of a first user is transformed into a third potential trip data object. A second predicted trip belonging to a second predicted trip series of a second user is transformed into a second potential trip data object. The matching score of the third and the second potential trip data objects is increased if at least one further pair of potential trip data objects exists having assigned a matching score above a matching score threshold value, the further pair of potential trip data objects comprising one further potential trip data objects of the first predicted trip series and one further potential trip data object of the second predicted trip series. Said increasing of the matching score results in a preferential allocation of users as trip accompanies sharing multiple future trip plans.

Even in case the matching score between the third potential trip data object and a fourth potential trip data object, the fourth potential trip data object belonging to a third user, the matching score being solely based on a comparison of the attributes of those two compared future trips, would be greater than the matching score of the third and the second potential trip data object, the first and the second users are assigned to each other as trip accompanies according to said embodiment, provided the first and the second user share not only one planned future trip but multiple future trips, the future trips belonging to predicted trip series.

Said feature is beneficial, because it allows to preferentially assign those users as trip accompanies to each other who are already acquainted with each other because they share trips on a regularly basis.

According to further embodiments of the invention, the step of transforming the third predicted trip belonging to the first predicted trip series into a third potential trip data object for comparison with the second potential trip data object belonging to the second predicted trip series during the matching method comprises the steps of:

including attributes of other predicted trips of the first trip series as additional attributes of the third potential trip data object, including attributes of other predicted trips of the second trip series as additional attributes of the second potential trip data object, executing, during the matching method, a comparison between the third and the second potential trip data object, wherein the matching score of the compared potential trip data objects is higher in case the first and the second users corresponding to the first and third predicted trip series were predicted to have multiple similar or identical future trip plans. Said effect is reached by the representation of attributes of the other potential trip data objects of a predicted trip series in each potential trip data object of said series. For example, if a predicted trip series comprises the predicted trips T1, T2 and T3, the potential trip data object representing T2 could comprise in addition to its own attributes (starting time, starting date, starting place, destination, user profile preferences etc) attributes of the T1 and T3 trip. Preferentially, those additional attributes corresponding to other trip data objects of a predicted trip series have assigned a lower weight than the attributes of the predicted trip represented by a potential trip data object. According to some embodiments of the invention, each potential trip data object is implemented as multi-dimensional vector and each additional attribute of the potential trip data object is represented by an additional vector dimension.

Dynamical Assignment of Driver Roles by the Matching Method

Contrary to existing trip sharing services, the driver and passenger roles (with the exception of categorical drivers and passengers), are dynamically assigned to matching users during the execution of the matching method in order to optimize the allocation of trip accompanies for predicted or explicitly specified future trips. For example if a first user prefers but does not insist on acting as driver and a second user is determined by the matching method who has very similar future trip plans and who insists on acting as driver, the first user may be dynamically assigned the passenger role during the execution of a matching method. As a result, the two users can be allocated as trip accompanies for a planned trip and the number of cars used can be minimized. This effect would not have been possible if the driver/passenger roles would have been immutably be assigned to the registered users of the trip sharing service.

According to further embodiments of the invention, the trip sharing service further comprises a module for analyzing the global trip history of all users and to determine the region specific fraction of trip data objects whose corresponding users prefer to act as drivers or passengers. The information gathered in this step is used for multiple purposes:

for reducing the unevenness of driver/passenger distributions in different regional districts, thereby also improving the efficiency of the matching method. The unevenness of driver/passenger distribution can be reduced e.g. by changing the pricing strategy in a way making it more attractive for registered users of a trip sharing service to act as drivers in districts having a surplus of users preferentially acting as passengers. For example, the money a driver receives per mile can be increased. Likewise, to reduce a surplus of drivers in a particular district, the money a driver receives per mile can be diminished by the trip sharing service, thereby making it less attractive for a registered user to act as driver and more attractive to act as passenger. Alternatively or in addition to adapting the pricing policy of the trip sharing service, the matching score value can be increased between the potential trip data objects of those users whose allocation to each other as trip accompanies would result in a diminishing of the unevenness of driver/passenger distribution in different regions.

for providing third parties with information on the distribution of driver/passenger preferences, being an indicator of the fraction of people owning a car and being willing to buy particular products or services correlating with the ownership of a car, thereby allowing said third parties for a more precise placement of advertisement campaigns, and for generating a graphical representation of the gathered information on the distribution of driver/passenger preferences, the graphical representation being a regional map comprising districts, the districts being assigned a particular color or hachure depending on the fraction of drivers or passengers in a particular district, the graphical representation helping the operators of the trip sharing service and third parties to improve their services and to create successful advertisement campaigns and helping users or potential users of the trip sharing service to determine the driver/passenger distribution in the region they live in.

The unevenness of driver/passenger distributions in different regional districts, e.g. urban or rural districts, can be reduced e.g. by automatically increasing the price a driver gets for acting as driver. In districts characterized by an excess of drivers, the price a driver receives may be diminished by the trip sharing service. In districts characterized by a shortage of registered users being willing to act as drivers, the price per mile paid to a driver may be increased automatically by the trip sharing service, thereby increasing the motivation for participants of the service to act as drivers.

According to further embodiments of the invention, the matching method is adapted based on the driver/passenger distribution obtained from the global analysis of the global trip history. The matching method is adapted in a way that compared potential trip data objects belonging to a first and a second user are assigned a higher matching score if an assignment of both users helps to reduce the unevenness of driver/passenger fractions in a particular area.

The matching score of a first trip data object corresponding to a first user and a second potential trip data object corresponding to a second user is increased if the first user prefers the driver role, the second user prefers the passenger role, and if the starting point of the first potential trip data object belongs to a district with higher driver fraction than the district comprising the starting point of the second potential trip data object. The allocation of users with different driving preferences across district borders of two districts having an unequal distribution of drivers and passengers helps to reduce said unevenness provided the district the driver starts from has a higher driver ratio than the district the passenger starts from.

Likewise, the matching score is diminished if the first user corresponding to a first potential trip data object is assigned the driver role, the second user corresponding to a second potential trip data object is assigned the passenger role and the starting point of the first potential trip data object belongs to a district with lower driver fraction than the district comprising the starting point of the second potential trip data object, because said cross-district border allocation of the first and the second users as trip accompany according to said example would further increase the surplus of drivers in one district and the lack of drivers in the other.

According to further embodiments of the invention, an unequal distribution between drivers and passengers in different districts is reduces by adapting the assignment of driver and passenger roles performed by the matching method. Each registered user has specified his preference to act as driver or passenger in his user profile. Said preference is used as additional feature of potential trip data objects during the matching method. Per default, the matching method determines a matching score based on the driver/passenger preferences as specified by the registered users, the score being highest between users of opposite driver/passenger preferences. In case a first potential trip data object of a first user of a first district is matched against a second potential trip data object of a second user of a second district, the second district having a significantly lower driver fraction than the first district, the driver preference value of the first user is diminished and the driver preference value of the second user is increased by the trip sharing service. Only the driver/passenger preferences of categorical drivers and passengers remain unchanged in said use case scenario. In effect, if the first as well as the second user has a driver preference value of e.g. 80%, the driver preference value of the second user will be diminished during the matching of the first and second user, resulting in the assignment of the driver role to the first user provided that the trip plans and personality traits of the first and second user reach a sufficiently high congruency level. In case enough car seats are unoccupied in the car of the second, additional passengers are allocated as trip accompany to the second user by the trip sharing service. As the distance between the starting place of the driver and the pick-up place of a passenger should be as short as possible, it is highly beneficial to assign the driver role preferentially to the second user starting his trip from the second district with low driver fraction. If the driver role would have been assigned to the first user starting from a district with high driver fraction, the chances of a second potential passenger to be picked up from within the first district is not significantly increased because a multitude of other persons acting as drivers exist in the first district anyway. The chances of a second potential passenger starting in the second district are, however, bad, because he will probably live not close enough to most drivers of the first district to be picked up and there exist only few drivers in his own district. The situation changes in case the second user starting from the second district is assigned the driver role: the chances of a second potential passenger starting from within the first district to be picked up are only slightly diminished as many alternative drivers exist in his district. The chances of a second potential driver starting in the second district are, however, significantly increased, because he has higher chances of living close enough to the starting place of the second user to be picked up and there do not exist many alternatives in his district. As a result of reducing the unequal distribution of driver/passenger fractions, the trip sharing service is operable to allocate drivers and passengers to each other highly efficiently.

According to still further embodiments of the invention, the trip sharing service further comprises a module for analyzing the global trip history of all users and to determine a global set of pairs of connected locations. Each pair of connected locations corresponds to the set of trip data objects having the first location of the location pair as starting location and the second location of the location pair as destination. For each pair of locations a frequency value is calculated. Said frequency value is indicative of the number of trip data objects in the global history having the first location of the pair as starting location and the second location of the pair as destination and been executed within a predefined or user defined time range. An example is depicted in table 1: the global analysis of the global trip history assigns each location pair consisting of a starting location and a destination the average number of trips data objects being executed within a time range of 4 hours.

TABLE 1

| Average Number of potential trip data objects starting at 'first location' and having 'second location' as destination being executed within 4 hours | Location pairs | |
| --- | --- | --- |
| | First location | Second location |
| 234 | A | B |
| 66 | A | C |
| 74 | D | A |
| 24 | A | E |
| 412 | C | D |
| 1 | E | C |

According to further embodiments of the invention, a global clustering is executed to assign each pair of locations to a frequency group. Said embodiments of inventions are advantageous, because the frequency value determined for each pair of locations may vary greatly e.g. between location pairs connecting remote rural villages and location pairs connecting nearby transport nodal points in a city. According to said embodiments of the invention, a set of predefined frequency ranges is specified, as depicted in table 2.

TABLE 2

| Cluster defined by the average number of potential trip data objects starting at 'first location' and having 'second location' as destination being executed within predefined time frame | Location pairs | |
|---|---|---|
| | First location | Second location |
| >100 per hour and <= 150 per hour | C | D |
| >20 per hour and <= 100 per hour | A | B |
| >10 per hour and <= 20 per hour | A | C |
| | D | A |
| >5 per hour and <= 10 per hour | A | E |
| >0 per hour and <= 5 per hour | E | C |

According to further embodiments, each registered user of the trip sharing service is allowed to send an invitation to a person, in particular to a person not yet being a registered user of the trip sharing service. Preferentially, but not necessarily so, the invitation is sent via e-mail and comprises a graphical representation of the frequencies of trips executed by members of the trip sharing service. For example, in case the invited user lives at location A, the submitted invitation may indicate the frequency according to which a trip between A and other locations could be arranged in the past by the trip sharing service.

The graphic representation of the selected region is a preferentially a color- or hachure-encoded geographic map comprising multiple districts or routes connecting locations belonging to a location pair and being indicative of the probability that a user will find an appropriate trip accompany for a trip starting from or directing to his home location A.

According to further embodiments of the invention, the invitation may alternatively or in addition comprise the driver/passenger fraction of a selected geographic region. Preferentially, the selected geographic region will be the home of the invited person. The invitation could comprise a text describing the functions and benefits of the trip sharing service and a map of the geographic region surrounding the home of the invited user as depicted in FIG. 13.

According to further embodiments of the invention, the trip prediction and the TSPR prediction algorithm are executed automatically on the trip sharing server for a first user, followed by an automated execution of a matching method but without the step of allocating users to each other. Rather, the results obtained from the matching step are submitted to a user to inform him on the number of available trip accompanies for a future trip. The example given in the following is applicable to explicitly specified planned trips as well as automatically predicted trips and trip series. Preferentially, it applies to automatically predicted trips which are particularly advantageous due to the reduced number of man-machine interaction steps necessary.

A user may use the tip sharing service to commute to work and back. Typically, the employees all arrive within a narrow time frame within 8 a.m. and 9 a.m. The trips from work to home executed by various employees are distributed within a broader time range, e.g. between 4 p.m. and 8 p.m. and may vary from day to day. It may therefore be important for a user of the trip sharing service to know how many people or employees using the trip sharing service are still at the company's site at each working day afternoon or evening. As the user used the trip sharing service to reach his office as passenger, he has to be sure that at least 2 or 3 other trips from his office to home are available and to quit his work in time to make an appointment with another user of the trip sharing service who is willing to pick him up. Said 'passenger' user is able to retrieve from the trip sharing service a notification on how many matching drivers are predicted to be available for a particular future trip from work to home, wherein said information is updated on a regular basis. The planned trip of the user acting as passengers as well as the trips suggested by the trip sharing service corresponding to users acting as drivers may likewise be created by executing the trip prediction algorithm or the TSPR algorithm on a type I or II processing device or may be explicitly specified by the users of the trip sharing service.

BRIEF DESCRIPTION OF THE DRAWINGS

In the following, embodiments of the invention are described by way of example, only making reference to the drawings in which.

DETAILED DESCRIPTION

Figure 1:
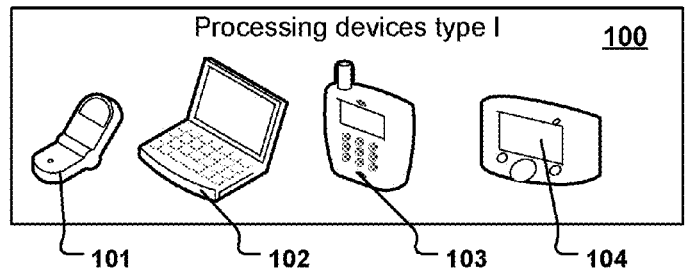
FIG. 1 depicts a set of type I processing devices.

FIG. 1 depicts the set 100 of possible type I processing devices. The set comprises mobile phones 101, netbooks or notebooks 102, smart phones 103, or navigation devices 104.

Figure 2:
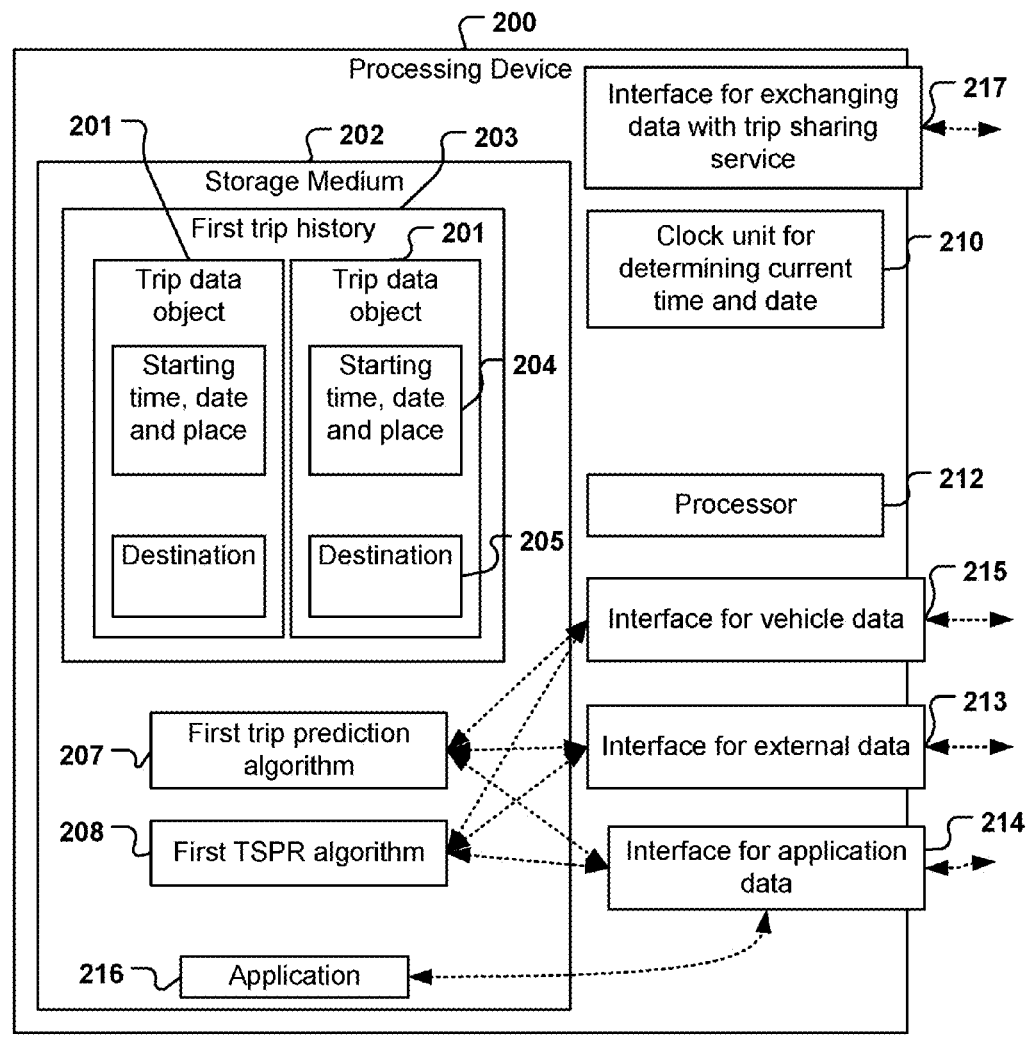
FIG. 2 depicts a type I processing device with a storage medium comprising instructions for a first trip prediction algorithm and a first TSPR algorithm.

FIG. 2 is a block diagram of a processing device 200 of a first user according to one embodiment of the invention. The processing device comprises a non-transitory storage medium 202, a clock unit 210 for determining the current time and date, a processor 212 for executing computer interpretable instructions stored to storage medium 202, and various interfaces. Interface 217 represents a physical and logical interface for exchanging data with a remote trip sharing service. According to some embodiments of the invention, the physical component of interface 217 is an Ethernet card and the logical interface is a web service interface being operable to submit an XML based service requests to the web service API 1202 of the remote trip sharing service. According to further embodiments of the invention, processing device 200 further comprises an interface 215 for receiving vehicle data, an interface 213 for receiving external data or an interface 214 for exchanging application data with a further application having been installed on the processing device 200, e.g. a calendar application.

While the computer-readable non-transitory storage medium 202 is shown in the exemplary embodiment to be a single medium, the term "non-transitory storage medium" should be taken to include a single medium or multiple media (e.g., a centralized or distributed database, and/or associated caches and servers) that store the one or more sets of instructions. Said term shall also be taken to include any medium that is capable of storing or encoding a set of instructions for execution by a processor that cause the processing device to perform any one or more of the methodologies of the present invention, or that is capable of storing or encoding data structures utilized by or associated with such a set of instructions. The term "computer-readable non-transitory storage medium" shall accordingly be taken to include, but not be limited to, solid-state memories, optical and magnetic media such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

Storage medium 202 comprises the trip history of at least a first user, referred to as first trip history 203. The first trip history 203 comprises trip data objects 201, representing past trips of the first user. Each trip data object of a trip history comprises at least the starting time and date and starting location of a trip and the destination 205 of said trip. Storage medium 202 further comprises computer interpretable instructions which, when executed by processor of 212, result in the generation and execution of a first trip prediction algorithm 207.

According to further embodiments of the invention, the storage medium 202 further comprises computer interpretable instructions which, when executed by a processor 212, result in the generation and execution of a first TSPR algorithm 208.

According to further embodiments of the invention, the processing device 200 further comprises one or multiple additional applications 216 having been installed on storage medium 202 and being operable to exchange data with the first prediction algorithm 207 and/or the first TSPR algorithm 208 via an interface 214 for application data. Via the interface 213 for external data, the first trip prediction algorithm 207 and/or the first TSPR algorithm may retrieve external data provided by remote service providers. Via the interface 215 for vehicle data, the first trip prediction algorithm 207 and/or the first TSPR algorithm can retrieve the data provided by the vehicle of the first user.

Figure 3:
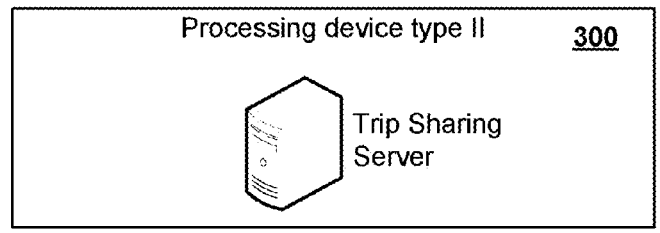
FIG. 3 depicts a type II processing device.

FIG. 3 depicts a processing device according to type II, which is a server hosting a trip sharing service. The server can for example be laid server or any other single or multicore computer being operable to process might have a trip sharing service requests.

Figure 4:
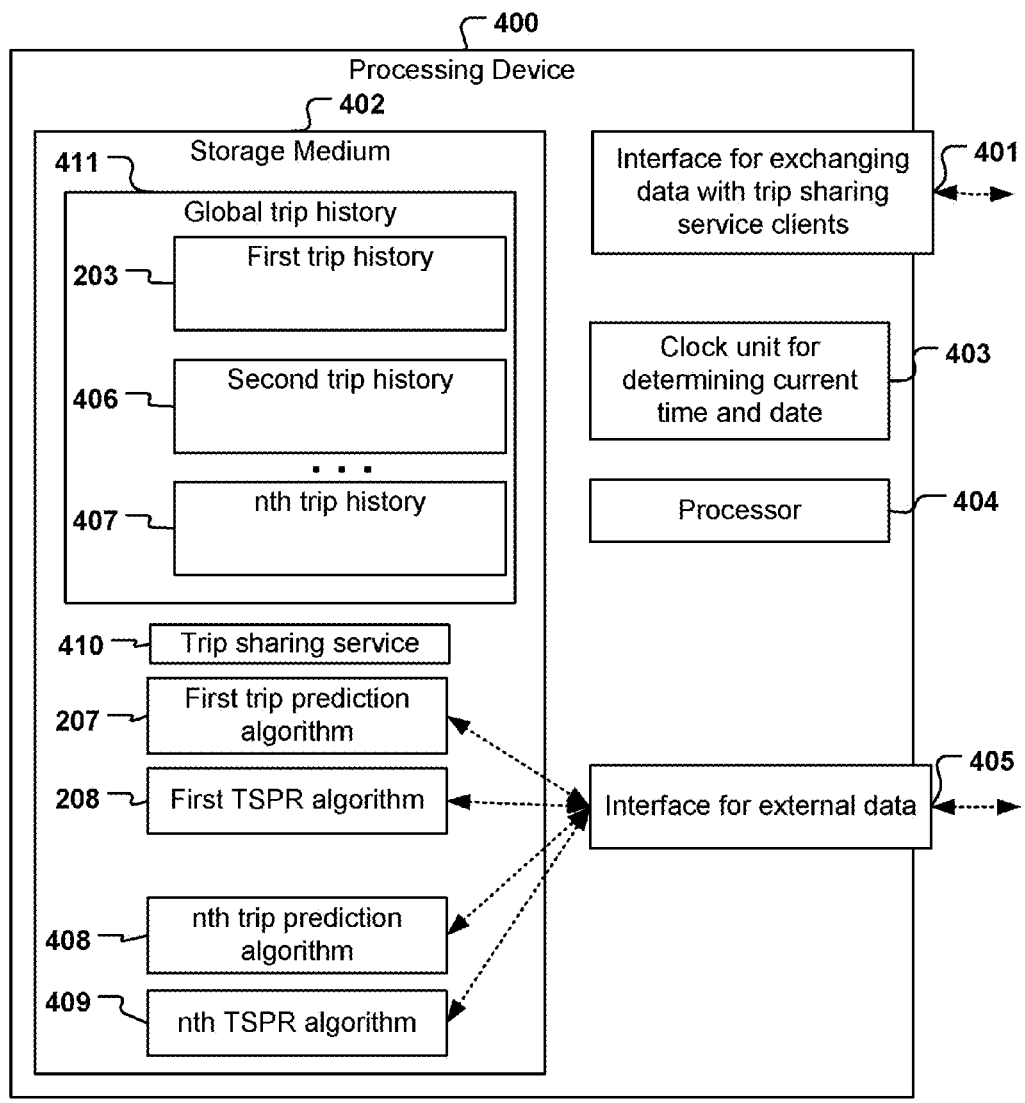
FIG. 4 depicts a type II processing device with a storage medium comprising instructions for a first prediction algorithm and a first TSPR algorithm.

FIG. 4 depicts one embodiment of a type II processing device 400 in greater detail. Processing device 400 comprises an interface 400 for exchanging data with trip sharing service clients, e.g. processing device 200. Device 400 further comprises a clock unit 403 for determining current time and date, a processor 404 for executing computer interpretable instructions of multiple algorithms and application having been installed on storage medium 402. The non-transitory machine-readable medium 402 can be a single medium or multiple media (e.g. a centralized or distributed database, and/or associated caches and servers) that store the one or more sets of instructions. The term 'machine-readable medium' shall also be taken to include any medium that is capable of storing or encoding a set of instructions for execution by the processor 404 and that cause the processor to perform any one or more of the methodologies of the present invention, or that is capable of storing or encoding data structures utilized by or associated with such a set of instructions. The term 'machine-readable medium' shall accordingly be taken to include, but not be limited to, solid state memories, optical and magnetic media, read-only memories (ROMs), random access memories (RAMs) such as DRAM, EPROMs, EEPROMs, etc.

The storage medium 402 comprises a global trip history 411. The global trip history 411 comprises the trip history is of all registered users of the trip sharing service, for example first trip history 203 comprising trip data objects representing past trips of a first user of the trip sharing service, a second trip history 406 comprising trip data object representing past trips of a second user of the trip sharing service. For each registered user whose trip history comprises at least one trip data object, a trip prediction algorithm exist whose computer interpretable instructions are, according to the embodiment of the invention depicted in FIG. 4, also stored to storage medium 402. According to further embodiments, for each registered user in addition a TSPR algorithm exists whose computer interpretable instructions are stored to storage medium 402 in addition to the instructions of the user-specific trip prediction algorithms.

The first trip prediction algorithm 207 and a first TSPR algorithm 208 have been created based on the first trip history 203 of a first registered user. Analogously, an nth trip prediction algorithm 408 and an nth TSPR algorithm 409 have been created on the nth trip history 407 of an nth registered user of the trip sharing service 410. The computer interpretable instructions encoding of the trip sharing service 410 are according to the depicted embodiment also installed on storage medium 402. The general terms of 'creating' an algorithm based on the trip history of a user implies according to most embodiments of the invention a learning step. Said embodiments use neural networks or other machine learning approaches for predicting trips and trip series. According to embodiments of the invention wherein the trip prediction algorithm is not based on machine learning approaches in the narrow sense but rather on a statistical evaluation of all trip data objects existing in a trip history of a user, not a 'learning' in the strict sense of the word is applied as the statistical approach does not change with a growing amount of available trip data objects. Rather, as the size of the data basis grows, the accuracy of the prediction being based on the application of immutable statistical calculation steps will also grow and only the results of the trip prediction algorithm will change based on the growing number of trip data objects in a user's trip history. In the following, the general term of 'creating' a trip prediction algorithm based on the trip history of a user will be used, wherein the creation according to embodiments of the invention using machine learning based approaches refers to a learning process of the machine learning algorithm applied.

According to further embodiments, processing device 400 may in addition comprise an interface 405 for receiving external data, e.g. data obtained from whether forecast services, traffic announcement services, or various services offered by points of interests (POIs) such as gas stations, restaurants or hotels. According to said embodiments, the set of input parameters is received at the start of the trip prediction algorithm and at the actual start of a trip via interface 405. The input parameters received at the start of a trip can be attached to each trip data object of the trip history of a user and used for training the trip prediction algorithm. The input parameters received as input for the trip prediction algorithm may be assigned to a newly created potential trip data object representing a predicted future trip. The trip data objects in the trip history is of the users may therefore comprise, additional input parameters, e.g. received external data like the weather situation at the starting place at starting time of a particular trip. According to said embodiments, the accuracy of trip prediction by the trip prediction algorithms and the accuracy of the trip series prediction by the TSPR algorithms may increase by taking into consideration additional input parameters in addition to the current time and date.

Figure 5:
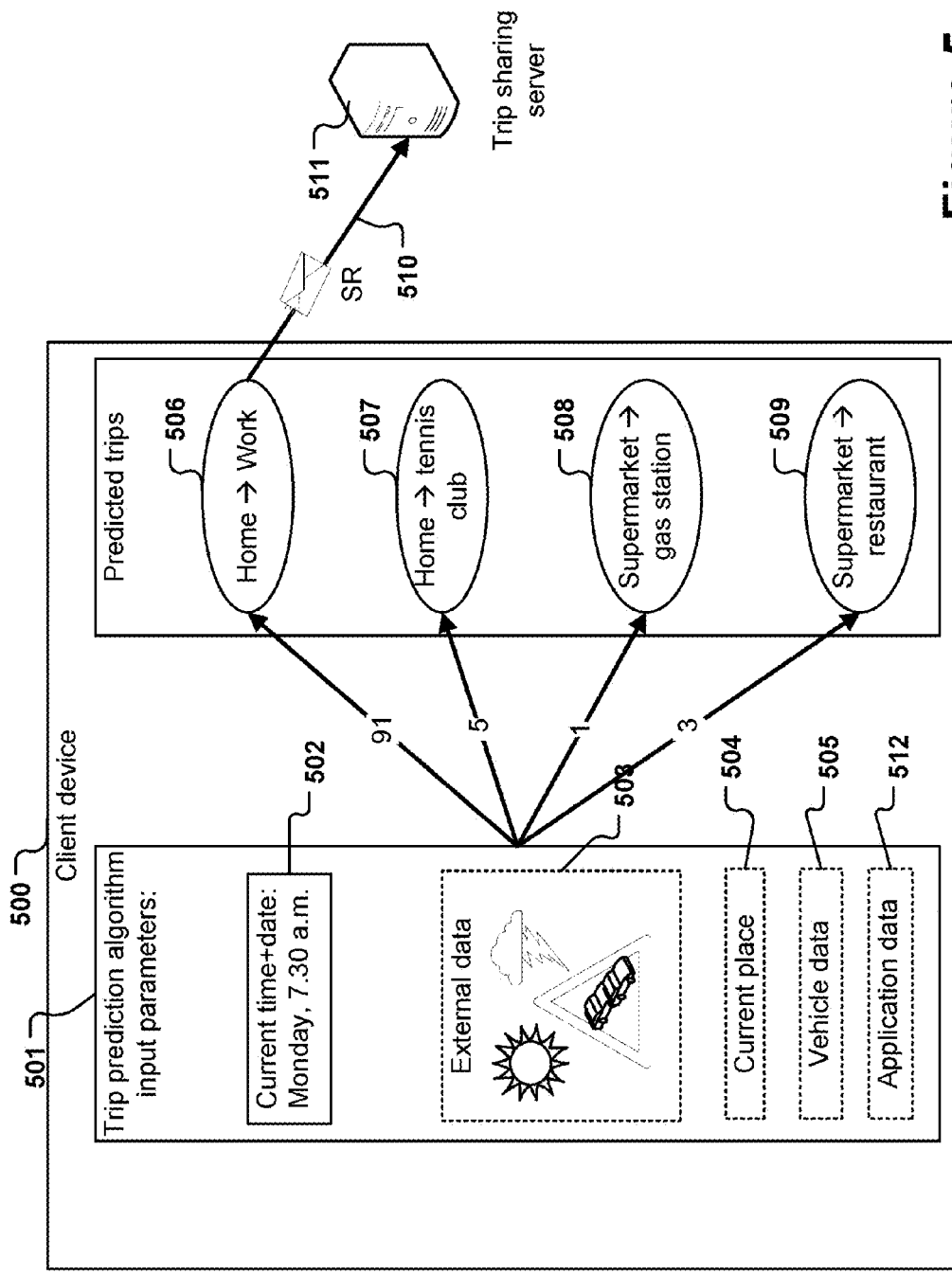
FIG. 5 illustrates the submission of a service request to a trip sharing server after having predicted at least one destination by the trip prediction algorithm.

FIG. 5 illustrates the application of a first trip prediction algorithm 207 on the first trip history 203 of the first user of processing device 500 given a set of input parameters 501, the input parameters being used as input by the first trip prediction algorithm. The client device 500 according to the depicted embodiment can, for example, be a user's mobile phone which is turned on on a Monday morning, 7.30 a.m. The mobile phone comprises an internal clock being operable to determine the current time 7.30 a.m. and current date, wherein the determination of the current date implies determining that the current day is a Monday. The mobile phone may, but does not necessarily have to, be operable to receive external data 503 such as regional weather data or traffic announcements. In case the client device 500 comprises an interface 505 to receive vehicle data of the first user's car, the set of input parameters 501 may further comprise vehicle data, e.g. the filling level of the car's gas tank. In case the client device 500 comprises a component for determining its current position, e.g. a GPS antenna, the current place 504 may be determined by the client device 500 and may be used as further input parameter 501.

Figure 6:
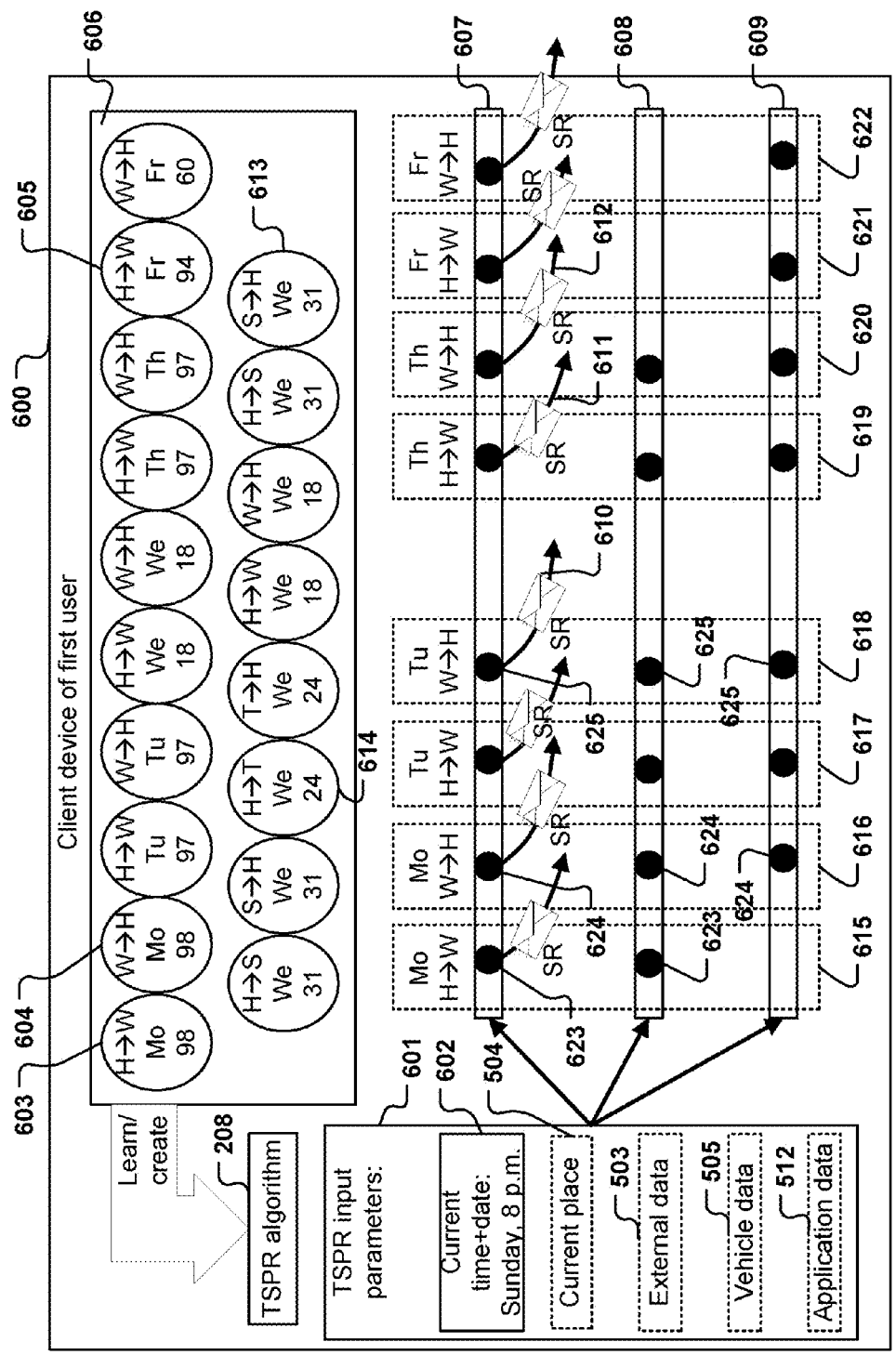
FIG. 6 illustrates the submission of multiple service requests to a trip sharing service after having predicted at least one trip series by the TSPR algorithm.
Figure 7:
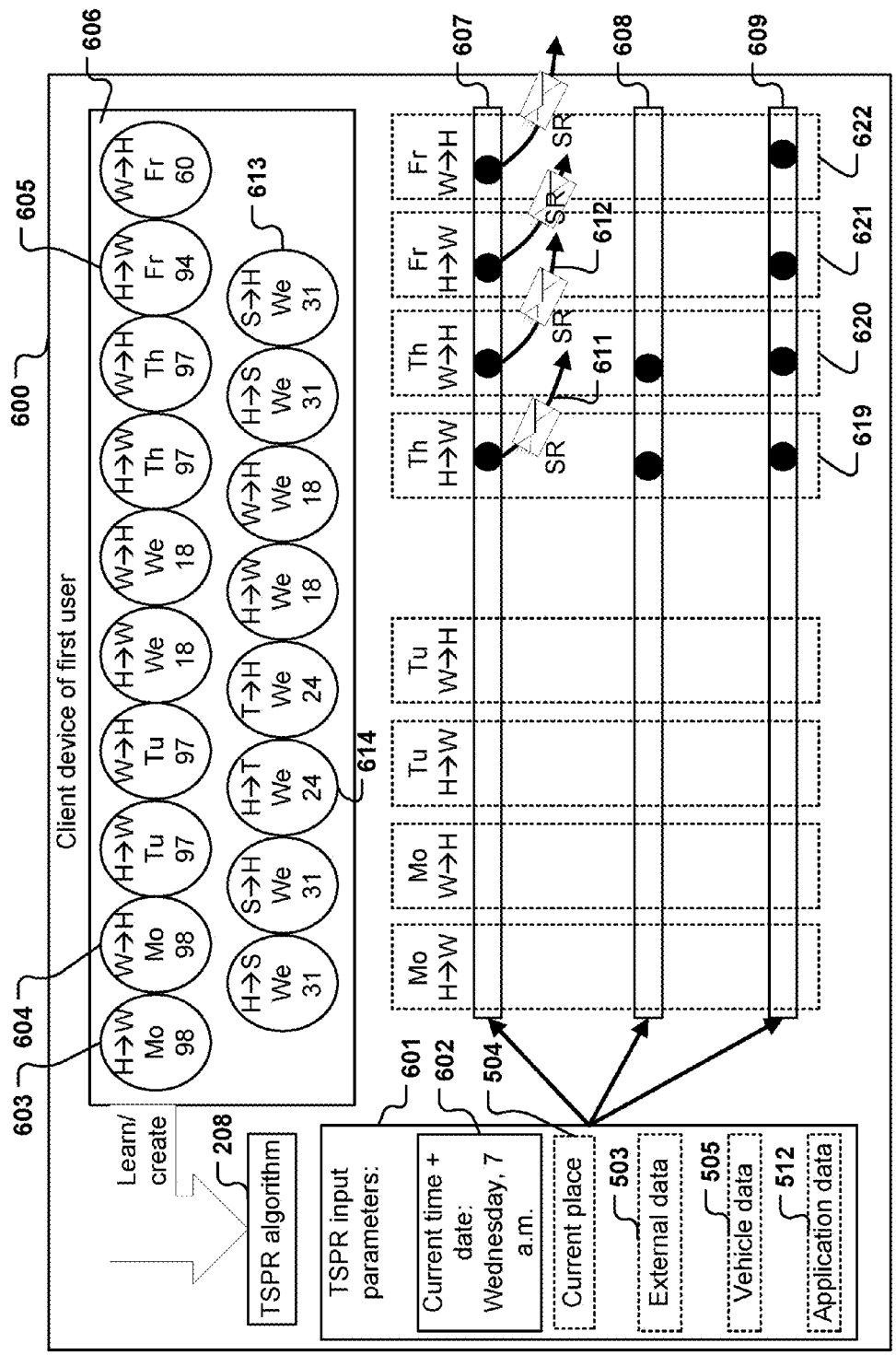
FIG. 7 illustrates the submission of multiple service requests to a trip sharing service, wherein the submitted service requests corresponding to trips of the second half of a predicted trips series.

The first trip prediction algorithm having been created based on the first trip history of the first user takes the set of gathered input parameters 501 as input for predicting a future trip, the input parameters comprising at least the current time and date 502. Said mandatory input parameters 502 (602) are indicated in FIGS. 5 (FIGS. 6 and 7) via a solid frame border. Depending on the embodiment of the invention, in particular, depending on the interfaces comprised by the processing device running the trip prediction algorithm, additional input parameters 503, 504, 505 or 512 are indicated in FIGS. 5-7 as dotted frame borders. The first trip prediction algorithm has learnt based on the data in the first trip history that the first user drives from home to work every Monday between 7.15 a.m. and 7.45 a.m. If there exist only very few exceptions from this rule in the first user's trip history, the first trip prediction algorithm predicts a trip 506 from home to work starting at the current starting time and assigns the predicted trip a high prediction score value of 91 units. The first trip prediction algorithm predicts three further trips 507, 508 and 509 with lower prediction score values. Trip 507 from home to the tennis club reaches the prediction score value of 5 units, trip 508 from a local supermarket to a gas station is assigned a prediction score value of 1 unit and the trip 509 from the local supermarket to a restaurant is assigned a prediction score value of 3 units. The first user may have specified at minimum prediction score value for automatically submitting trip sharing service requests of 90 prediction score units. Predicted trip 506 has a prediction score of 91 units. Therefore, a service request 510 is automatically submitted to the trip sharing server 511. The service request 510 comprises the predicted starting place (home), the starting time and date determined by the client device of the user (Monday, 7.30 a.m.) and the predicted destination. In case the client device was operable to receive additional input parameters such as external data, the starting place or vehicle data, said parameters may be contained in the service request 510 in addition. The trip sharing service, after receiving the service request 510, creates a potential trip data object comprising the data of the received service request. The created potential trip data object comprises at least the starting time and date, the starting location and the destination of the planned trip. It may in addition comprise the additional input parameters 503, 504, 512 and/or 505 gathered by the client device and submitted in the service request 510 to the trip sharing server. The potential trip data object according to further embodiments of the invention in addition comprises user profile data which is gathered by mapping the service request of the first user to a user profile of the first user stored at storage medium 402 of the trip sharing server.

After the creation of the new potential trip data object, a matching method is executed by the trip sharing service comparing the created potential trip data object was all potential trip data objects of other registered users existing already in storage medium 402.

FIG. 6 illustrates the prediction of trip series by a first TSPR algorithm 208 running on type I processing device 600 of a first user, e.g. a user's mobile phone. The input parameters 601 used by the TSPR algorithm comprise at least the current time and date 602. According to further embodiments, the input parameters 601 may further comprise external data 503, the current place 504 of the client device 600, vehicle data 505 or application data 512. If, and which kind of additional input parameters 504, 503, 505, 512 are used by the TSPR algorithm depends on the kind of TSPR algorithm used in a particular embodiment of the invention and depends on the interfaces comprised by client device 600. At least the current time and date 602 are required as input parameters to initiate the execution of the TSPR algorithm.

According to the embodiment depicted in FIG. 6, the clock of the client device 600 determines Sunday, 8 p.m. as current time. Said time and date is used as input for the TSPR algorithm.

The first user drives to work and back very regularly every Monday, Tuesday, Thursday and Friday. On Wednesday he usually does not work except in weeks when the workload is very high. As the workload in this depicted scenario is not possible input parameter, the TSPR algorithm is not able to learn from the trip history of the first user whether the first user will drive to work and back on Wednesdays. As a result, the TSPR algorithm is not able to predict which trip the user will execute on Wednesdays with a sufficiently high prediction score.

According to the embodiment of the invention depicted in FIG. 6, the first trip history 606 of the first user comprises a multitude of trip data objects. For space reasons, figure item 606 does not depict each trip data object with one symbol but rather illustrates sets of trip data objects representing the same type of trip. Item 603, for example, represents 98 trip data objects, each of said trip data objects representing a past trip executed on a Monday from home to work and starting between 7.15 and 7.45 a.m. Item 604 represents 98 trip data objects, each of said trip data object representing a past trip executed by the first user on a Monday from work to home and starting between 5 p.m. and 7 p.m. Item 613 represents 31 trip data objects, each of said trip data objects representing a past trip executed by the first user on Wednesdays from a local supermarket to home and starting between 1 p.m. and 1.30 p.m. Item 614 represents 24 trip data objects, each of said trip data object representing a past trip executed by the first user on a Wednesday starting from home between 1 p.m. and 1.30 p.m. and having the local tennis club as destination. For space reasons, the starting time ranges are a not depicted in FIG. 6. The time ranges are predefined and can, according to some embodiments of the invention, be modified by a user.

According to further embodiments of the invention, the TSPR algorithm 208 is trained on the first trip history 606 of the first user.

According to further embodiments of the invention the TSPR algorithm 208 is based on a statistical approach. Trip data objects currently available in the trip history 606 are used by said statistically based TSPR algorithm to derive probabilities for the occurrence of trip series given a set of trip series prediction input parameters 601.

Upon execution of the TSPR algorithm taking input parameters 601 as input, three trip series 607, 608, and 609 are predicted, each having a trip series prediction score above a TSPR threshold value. The dashed boxes 615 to 622 indicate that all predicted trips within a dashed box and belonging to different trip series represent the same predicted trip (having the same starting time, starting place and destination). The predicted trip 624 for example is an element of all trip series 607 to 609 and specifies the trip from work to home executed on Mondays between 5 and 7 p.m. Although all predicted trip series 607 to 609 according to the depicted example have a prediction score above the TSPR threshold value, only the trips belonging to trip series 607 are transformed into service requests submitted to a remote trip sharing service. The reason for this is that trip series 608 is a sub-series of trip series 607. Trip series 608 is therefore ignored. Trip series 609 is also a sub-series of trip series 607, and in addition starts at a later point in time, because trip series 609 does not comprise the predicted trip element 623. None of the predicted trip series comprises a predicted trip executed on Wednesdays. The reason for this is that the trip history 606 comprises multiple trips data objects executed on Wednesdays which are in part mutually exclusive, e.g. the trips 614 from home to the tennis club or the trips 613 from the local supermarket to home, each of them starting between 1 p.m. and 1.30 p.m. For said reasons, trip series 607 is returned as a result of the TSPR algorithm. For each predicted trip of trip series 607, the service requests 'SR', e.g. service requests 610, 611, and 612, are created and submitted to a remote trip sharing service.

FIG. 7 depicts the same client device 600 of the first user as depicted and described in FIG. 6. The difference to the situation depicted in FIG. 6 is the current time and date, which is Wednesday, 7 a.m. in case of FIG. 7. Only those predicted trips lying in the future are considered as constituting elements of predicted trip series. The predicted trips lying in the past, e.g. 623 or 624, are ignored. As a result, trip series 609 is not a sub-series of 607. Trip series 608 is a sub-series of both trip series 607 and 609 and is therefore ignored. The predicted trips of the predicted trip series 607 and 609 represent the same future trips. Provided, that prediction score of trip series 607 and 609 are above a threshold value, the predicted trips of either of the two trip series (FIG. 7 depicts the submission of service requests for predicted trips of trip series 607) can be transformed into service requests 611, 612 and be submitted to a remote trip sharing service. The trip service requests are submitted automatically in case the TSPR score value of the corresponding trip series is above the 'automated submission' threshold value and are submitted upon confirmation by the user in case the TSPR score value of said trip series is below the 'automated submission' but above a 'confirmed submission' threshold value.

Figure 8:
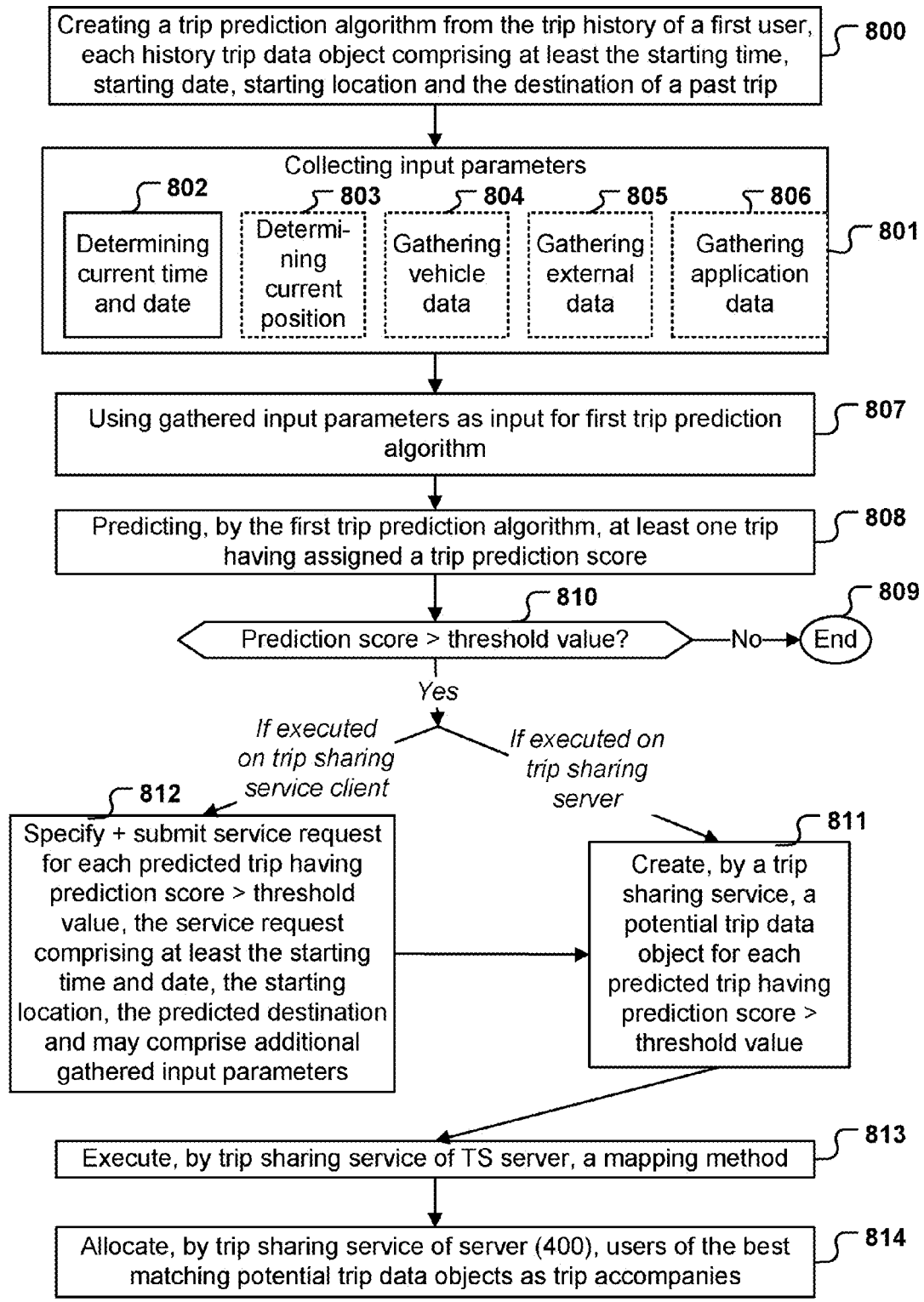
FIG. 8 is a flowchart illustrating the prediction of a trip, the execution of a matching method by the trip sharing service and the resulting allocation of matching users as trip accompanies.

FIG. 8 is a flowchart illustrating the execution of a user-specific first trip prediction algorithm.

In a first step 800, the first trip prediction algorithm is created from the trip history of the first user. The trip history of the first user comprises trip data object representing past trip executed by the first user, each trip data object comprising at least the starting time and place and the destination of the past trip. As a result of step 800, the trip prediction algorithm is operable to user-specifically predict future trips of a user given a set of input parameters.

In the second step 801, current input parameters are gathered to be used as input for the trip prediction algorithm in step 807. The collection step 801 comprises at least the step 802 of determining the current time and date. Depending on the embodiment of the processing device collecting the input parameters, the collecting step 801 in addition comprises the step 803 of determining the current position of the processing device, the step 804 of gathering vehicle data, the step 805 of gathering external data and the step 806 of gathering application data. The amount and type of gathered input parameters corresponds to the input parameters stored to the trip data objects of the trip history of the user. Only in case the trip prediction algorithm learned, during training, the correlation of a particular input parameter with a trip chosen by the user, the usage of additional input parameters as input for the trip prediction algorithm will increase the prediction accuracy of said algorithm.

In step 807, the gathered input parameters are used as input for the first trip prediction algorithm. The trip prediction algorithm predicts in step 808 at least one trip and assigns that at least one predicted trip a prediction score value. In decision 810 it is examined whether the prediction score of said predicted trip is above a threshold value. If this is not the case, the method is aborted in step 809. If the prediction score value is larger than that threshold value, the predicted at least one trip is transformed in step 811 by the trip sharing service to a potential trip data object.

The steps 800-810 and 812 can be executed on client device of a user belonging to type I processing devices and being operable to submit service requests to a remote trip sharing service. In this case the training of the trip prediction algorithm is executed based on the trip history of that single user owning the client processing device or, after a log-in process, on the trip history is of a few users using said processing device. After having predicted at least one future trip having a prediction score above the threshold value, for each of said predicted future trips a service request is created and submitted in step 812 to the remote trip sharing service. The created service request comprises at least the starting time and date, the starting place and the destination of the predicted trip. It may also comprise additional input parameters gathered in step 801.

In case the steps 800-810 are executed on a type II processing device, the execution of step 812 is not necessary. The trip sharing service, after receiving a service request, extracts the data of the received service request and creates a potential trip data object comprising the features submitted in the service request. The created potential trip data object comprises at least starting time and date and starting location and the destination of the planned trip and may in addition comprise additional input parameters gathered in step 801.

The steps 800-810 can likewise be executed on the server hosting the trip sharing service. In this case, for each registered user of the trip sharing service a user-specific trip prediction algorithm is created based on the trip history of each registered user. After having predicted at least one future trip by a user-specific trip prediction algorithm running on the trip sharing server, for each predicted trip having a prediction score value above the automated submission threshold value of the first user a potential trip data object is created automatically. As the trip prediction is executed on the trip sharing server, there is no need to create a service request and the potential trip data object can directly be created after the trip prediction steps 808 and 810. The created potential trip data object may comprise in addition to the starting time, starting date, starting place and destination additional input parameters gathered in step 801 and user profile data.

In step 813, the trip sharing service executes the matching method. In the matching method, the at least one potential trip data object having been created by the trip sharing service and corresponding to the at least one predicted trip having been predicted in step 808 is matched to all potential trip data objects belonging to other registered users of the trip sharing servers. The matching method is executed as described previously. As a result, the first user is allocated in step 814 to at least one second user corresponding to the best matching potential trip data object as trip accompany.

The steps 811, 813 and 814 are always executed on the server hosting the trip sharing service.

Figure 9:
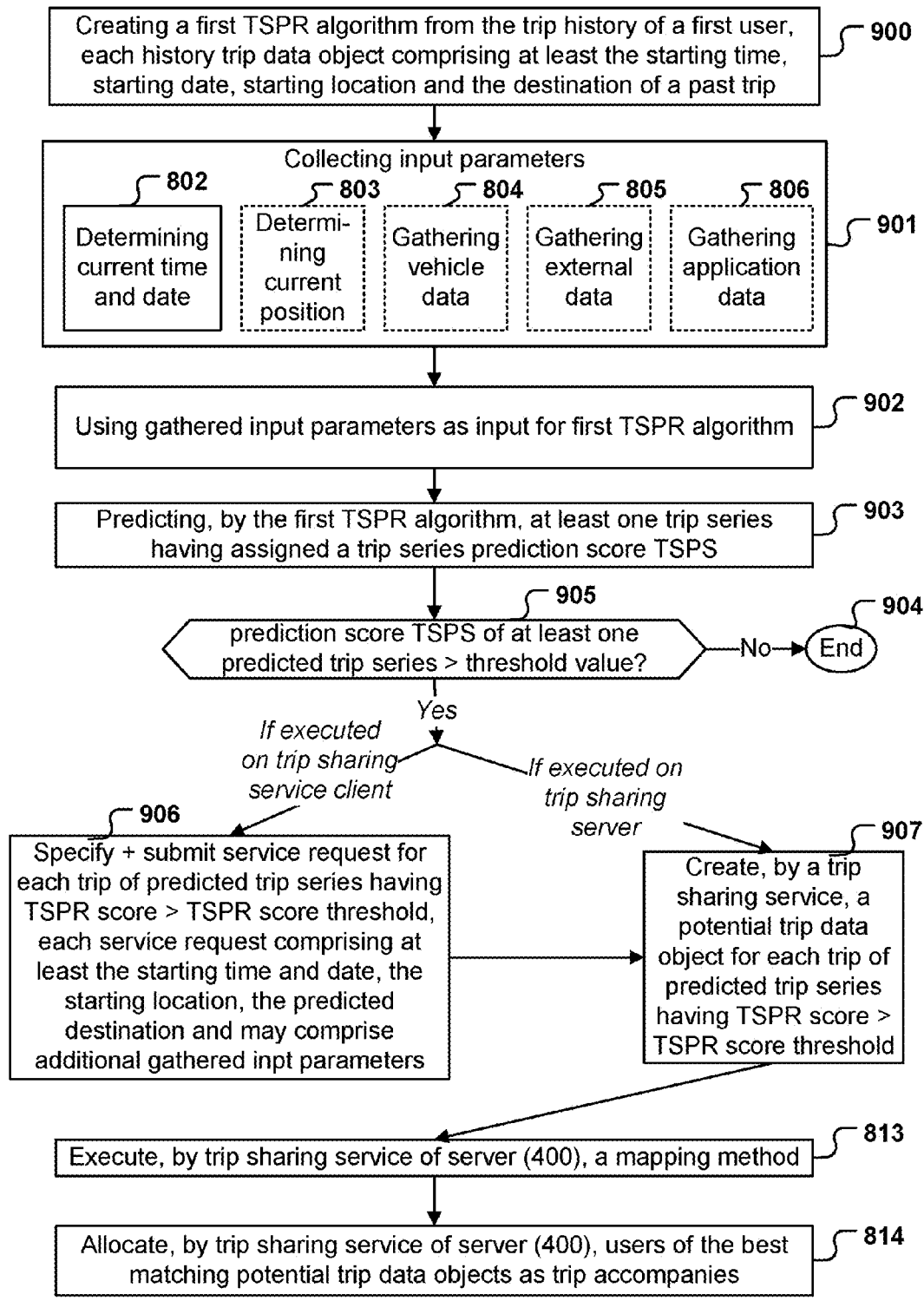
FIG. 9 is a flowchart of the prediction of a trip series, the execution of a matching method by the trip sharing service and the resulting allocation of matching users as trip accompanies.

FIG. 9 is a flowchart illustrating the execution of a user-specific first TSPR algorithm.

In a first step 900, the first TSPR algorithm is created from the trip history of a first user. The trip history of the first user comprises trip data object representing past trip executed by the first user, each trip data object comprising at least the starting time, date and place and the destination of the past trip. As a result of step 900, the TSPR algorithm is operable to user-specifically predict future trip series of the first user given a set of input parameters.

In the second step 901, current input parameters to be used as input for the TSPR algorithm are gathered. The collection step 901 comprises at least the step 802 of determining the current time and date. Depending on the embodiment of the processing device collecting the input parameters, the collecting step 901 in addition comprises the step 803 of determining the current position of the processing device, the step 804 of gathering vehicle data, the step 805 of gathering external data and step 806 of gathering application data.

In step 902, the gathered input parameters are used as input for the first TSPR algorithm. The TSPR algorithm predicts in step 903 at least one trip series and assigns that at least one predicted trip series a TSPR score value. In decision 905 it is examined, whether the TSPR score value of the at least one predicted trip series is above a TSPR threshold value. If this is not the case, the method is aborted in step 904. If the trip series prediction score value is larger than that threshold value, each predicted trip belonging to the at least one trip series is transformed in step 907 by the trip sharing service to a potential trip data object.

The steps 900-905 can be executed on client device of a user belonging to type I processing devices and being operable to submit service requests to a remote trip sharing service. After having predicted at least one future trips series having a prediction score above the threshold value, for each trip belonging to that predicted future trip series a service request is created and submitted in step 906 to the remote trip sharing service. The created service requests comprise at least the starting time and date, the starting place and the destination of the predicted trip. It may also comprise additional input parameters gathered in step 901. The trip sharing service, after receiving a service request, extracts the data of the received service request and creates a potential trip data object comprising the features submitted in the service request. The created potential trip data object comprises at least starting time and date and starting location and the destination of the planned trip and may in addition comprise additional input parameters gathered in step 801.

The steps 900 to 905 can likewise be executed on the server hosting the trip sharing servers. In this case, for each registered user of the trip sharing service a user-specific TSPR algorithm is created based on the trip history of each registered user. After having predicted at least one future trip series by a user-specific TSPR algorithm running on the server hosting the trip sharing service, for each predicted trip belonging to a predicted trip series having a trip series prediction score value above the threshold value a potential trip data object can be created automatically. As the trip series prediction is executed on the trip sharing server, there is no need to create service requests and the potential trip data objects can directly be created after the trip series prediction steps 903 and 905. Each created potential trip data object may comprise in addition to the starting time, starting date, starting place and destination additional input parameters gathered in step 901 and user profile data.

In step 813, the trip sharing service executes the matching method. In the matching method, the at least one potential trip data object having been created by the trip sharing service and corresponding to the at least one predicted trip having been predicted in step 808 is matched to all potential trip data objects belonging to other registered users of the trip sharing servers. The matching method is executed as described previously. As a result, the first user is allocated in step 814 to at least one second user corresponding to the best matching potential trip data object as trip accompany.

The steps 811, 813 and 814 are always executed on the server hosting the trip sharing service.

Figure 10:
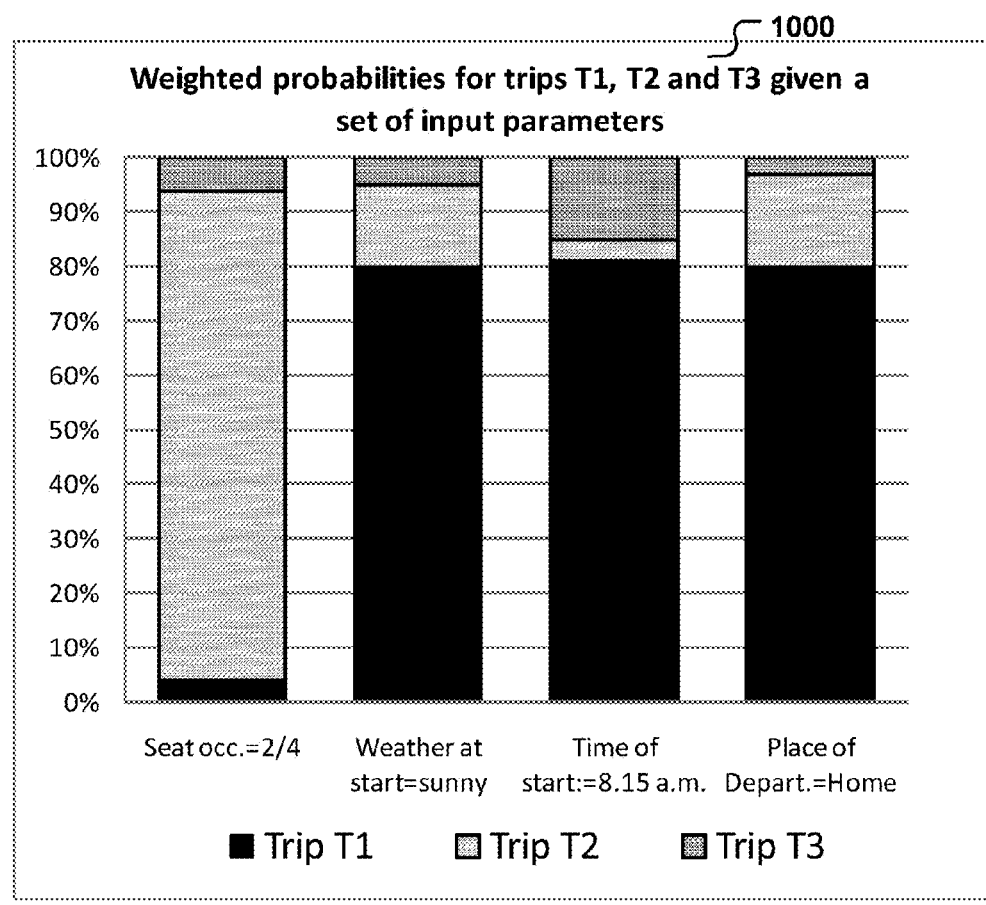
FIG. 10 illustrates an intermediate result produced by a statistics based trip prediction algorithm.

FIG. 10 is a bar chart illustrating probabilities for three trips T1-T3 given a set of input parameters, which is calculated according to a further embodiment of the invention, wherein the first trip prediction algorithm 207 is based on a statistical evaluation of all trip data objects of the first trip history 203. According to the depicted embodiment, four types of input parameters are gathered: the seat occupation in the vehicle, the weather at start, the starting time and the place of departure. A person skilled in the art knows how to appropriately represent each of those different parameter types numerically in an adequate way. Parameter types can be, for example, the filling level of a gas tank, a particular status or error code received from a vehicle, weather data like temperature or humidity, a traffic announcement being indicative of a traffic jam and the like. The granularity of a parameter type may differ between various embodiments of the present invention. According to some embodiments, weather data may be represented as one singular parameter type 'weather' comprising e.g. only four allowed parameter values 'sunny', 'rainy', 'stormy' and 'cloudy'. According to other embodiments of the invention, weather data may be represented by a multitude of parameter types, e.g. temperature, humidity, wind force. Said temperature parameter type may have assigned a set of allowed temperature parameter ranges, e.g. [<−20° C.], [−20° C.--9° C.], [−10° C.--1° C.], [0° C.-9° C.], [10° C.-19° C.], [>=20° C.].

According to preferred embodiments of the invention, time spans of about 15 or 30 minutes are used rather than particular moments in time as the departure time usually is not exactly the same for a particular type of trip, e.g. the daily trip from home to work. The weather data may be grouped into a limited set of categories, e.g. sunny, cloudy, rainy, stormy, and the like, each category being represented by numerical values, e.g. 1, 2, . . . 7 or the like. The place of departure does not refer to a single point on a geographic map bat rather to an area of a particular radius, as the car may be parked each evening at a different parking lot in the vicinity of the driver's home.

TABLE 3

Probability to choose a particular trip given a particular input parameter value

| Input parameter Type | Input parameter Value | Trip T1 | Trip T2 | Trip T3 |
|---|---|---|---|---|
| Seat Occupation | 2 out of 4 seats | 4% | 90% | 6% |
| Seat Occupation | 1 out of 4 seats | 10% | 95% | 5% |
| Weather at start | sunny | 80% | 15% | 5% |
| Time of start | [8.00 a.m.-8.30 a.m.] | 81% | 4% | 15% |
| Place of departure | Home | 80% | 17% | 3% |

Table 3 comprises a set of four types of input parameters gathered: the seat occupation in the vehicle, the weather at start, the starting time and the place of departure. For each input parameter type, at least one particular value is given in the second column. For the parameter type 'seat occupation', two input parameter values are given, '2 out of 4' and '1 out of 4'. The data in each line of table 3 indicates the probability that a driver of a vehicle will chose trip T1 as actual trip given a particular input parameter value. The determination of those probabilities is, according to a preferred embodiment of the invention, determined by the application of basic statistical algorithm. For example, if the trip history comprises 100 trip data objects of trips having been started when the weather was sunny, whereof 80 trip data objects represented trip 'T1', 15 trip data objects representing trip 'T2' and 5 trip data objects representing trip 'T3', then the probability of the driver of choosing trip T2 when the weather is sunny is calculated to be 15%. The probabilities for choosing 'T1' or 'T2' as trip given a starting time in the range of 8.00 a.m.-8.30 a.m. is calculated analogously from all trip data objects having a starting time within the same time frame.

The input parameter types have assigned a weight. It can, for example, be assumed that the starting time and location of the start are better predictors of the destination of a trip than the weather.

TABLE 4

Weight of input parameter types

| Input parameter Type | Input parameter Type Weight |
|---|---|
| Seat Occupation | 0.10 |
| Weather at start | 0.05 |
| Time of start | 0.45 |
| Place of departure | 0.40 |

The input parameter type weights are used in the next step to determine weighted probability to choose a particular trip given a particular input parameter value. For example, 90 out of 100 trip data objects having a seat occupation of 2/4 have assigned, according to table 3, trip 'T2'. As the weight of the seat occupation on the total score is, according to table 4, only 10%, the weighted probability to choose trip 'T2' given a seat occupation of 2/4 is 9% (table 5). In a further step, for each trip T1-T3, a sum of the weighted probabilities is calculated, e.g. for trip T1: 0.4%+4%+36.5%+32%=72.9%. In a final step, the summed weighted probabilities may be normalized to add to 100% altogether: To normalize the weighted probability sum of destination 'A' having 72.9%, the normalized score value would be calculated as 72.9%/(72.9%/+18.4%+8.8%)=72.9%/100.1=72.8%. (For the figures given in this particular example, the difference between the normalized and the not-normalized value is small, but this is not necessarily the case for other examples).

TABLE 5

Weighted probabilities of a user to choose a particular trip given a particular input parameter value; (Normalized) sum of weighted probabilities for each destination.

| Input parameter Value | Input parameter Type Weight | Trip T1 | Trip T2 | Trip T3 |
|---|---|---|---|---|
| Seat occ. = 2/4 | 0.10 | 0.4% | 9.0% | 0.6% |
| Weather at start = sunny | 0.05 | 4.0% | 0.8% | 0.3% |
| Time of start: = 8.15 a.m. | 0.45 | 36.5% | 1.8% | 6.8% |
| Place of Depart. = Home | 0.40 | 32.0% | 6.8% | 1.2% |
| Sum of weighted probabilities | | 72.9% | 18.4% | 8.8% |
| Normalized sum of weighted probabilities | | 72.8% | 18.4% | 8.8% |

According to the embodiment whose trip prediction algorithm is illustrated in tables 3-5, for each type of input parameter and for each known trip a probability value is calculated, the probability value indicating the probability that the known trip will be the actual trip given a particular input parameter value. Each parameter type is weighted. An overall probability sum is calculated for each known trip by summing up the weighted probabilities for each known trip given the current input parameters values. The set of known trips can comprise only those trips having been explicitly entered by the user but may, according to further embodiments, comprise also comprise trips having bean read from a calendar application comprising event specifications in an electronic calendar.

According to the final, normalized probability values of table 5, the user will chose trip T1 given the listed set of input parameters with a probability value of about 73%. The seat occupation would clearly have suggested another trip (T2), but the weight of this feature is lower than the time and location which both indicate T1 to be the most probable trip.

The statistics-based approach does not require a computationally expensive re-training of a neural network. The 'learning' effect in the statistics-based method lies in applying the same statistical calculations on an ever growing amount of trip data objects, thereby providing a trip prediction algorithm with increasing accuracy.

Figure 11:
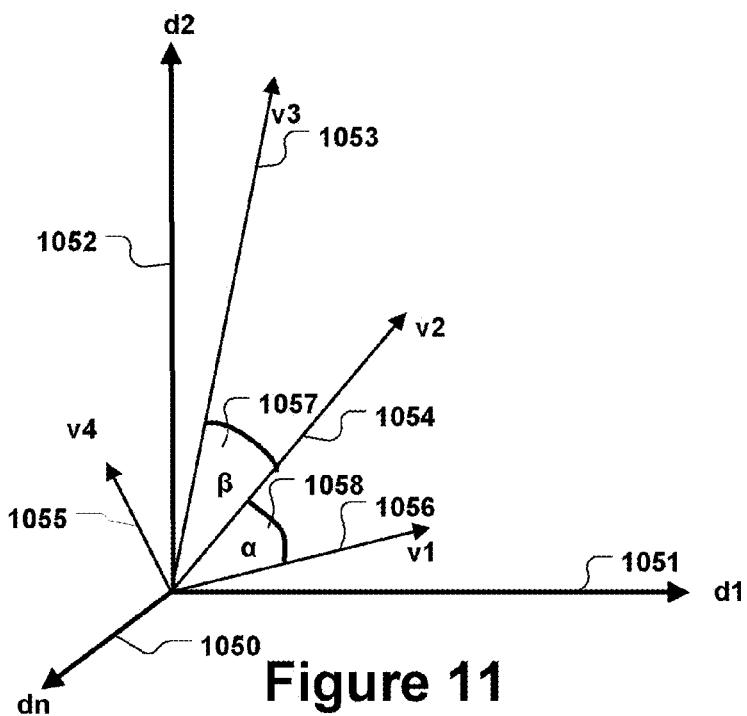
FIG. 11 illustrates a multi-dimensional vector representing a potential trip data object.

FIG. 11 illustrates four multi-dimensional vectors v1-v4 (1056, 1053, 1054 and 1055). Each vector represents a potential trip data object. A potential trip data object and its corresponding vector comprise specifications of a multitude of trip related and user related features. Each particular specification or feature of a potential trip data object corresponds to one dimension of the vector. FIG. 11 depicts the dimensions d1 1051, d2 1052 and dn 1050. Dimension d1 1051 could, for example, represent the smoking habits of a user, d2 the user's taste in music and dn the earliest acceptable starting time. Each dimension has assigned a weight. The weight of some of the features, e.g. the taste in music, is thereby specified by the user in his user profile. The weight determines the impact of each dimension on the overall matching score. The overall matching score obtained by comparing the vectors of two potential trip data objects of two different users. The similarity of two vectors is determined based on the angle 1057, 1058 between both vectors within a multi-dimensional space. The number of dimensions of that multi-dimensional space corresponds to the number of dimensions of the potential trip data object of each compared vector. The smaller said angle, the more similar are both multi-dimensional vectors to each other, and the higher the weight of a particular dimension, the higher the impact of that dimension on the similarity score of two vectors. The weighted similarity score between two vectors is referred to as matching score.

Figure 13:
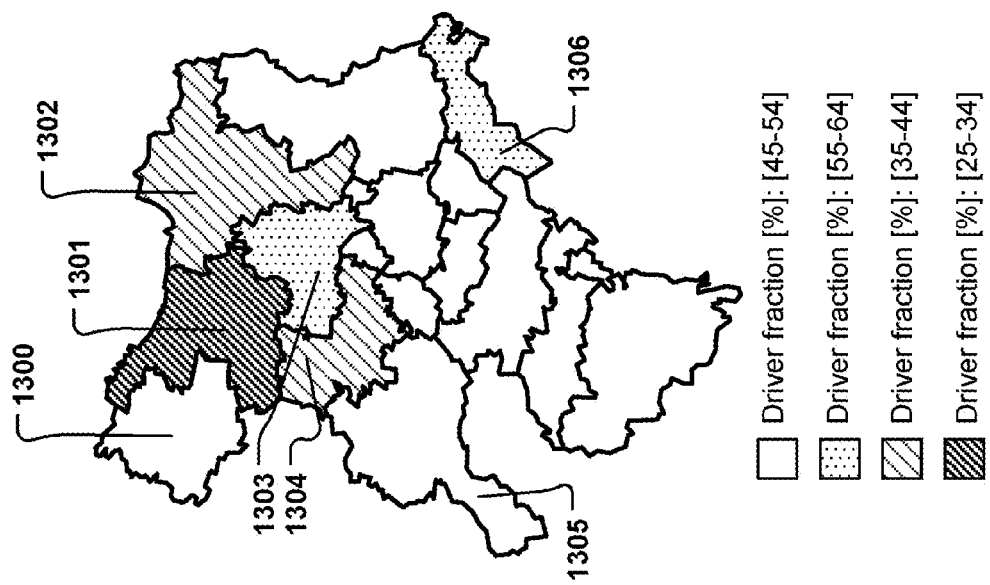
FIG. 13 is a geographic map wherein uneven distributions of driver/passenger preferences are outlined by a hachure.
Figure 12:
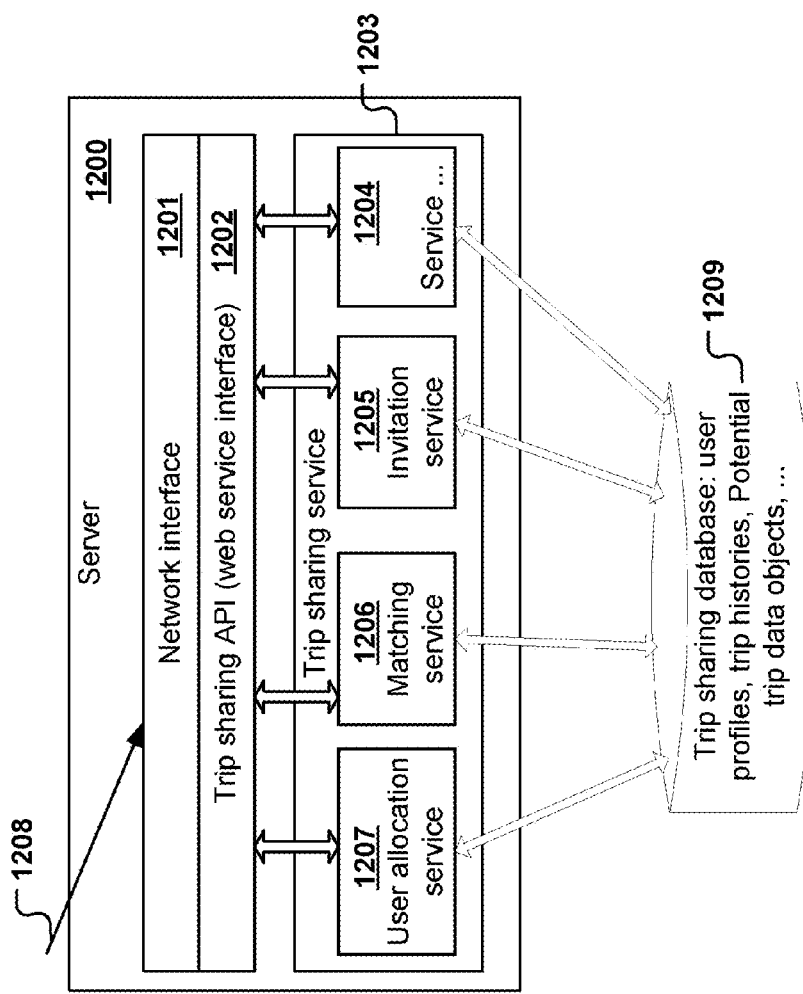
FIG. 12 is a block diagram of the trip sharing service showing some modules and interfaces of said service in greater detail.

FIG. 12 depicts a geographic map comprising multiple districts 1300, 1301, 1302, 1303, 1304, 1305, and 1306. Each district can be a rural district or an urban district. The trip sharing service according to the embodiment of the invention depicted in FIG. 13 is operable to execute the global analysis of all trip data objects stored in the global trip history of all registered users. A user can specify in each service request submitted to the trip sharing service value being indicative of his degree of preference to act as driver. In case the service request submitted to the trip sharing service does not comprise such a preference specification, or in case of future trip is predicted by the trip prediction method running on the trip sharing server, the driver preferences are used as specified in the user's profile for generating and specifying a potential trip data object. In case the trip represented by a potential trip data object was actually executed by the user and lies in the past, the potential trip data object is moved to the trip history of the user, thereby becoming the 'trip data object'.

The trip sharing service according to embodiments of the invention depicted in FIG. 13 groups all trip data objects having a starting location within a particular district into one district group.

In the next step, the number of trip data objects comprising a driver preference value indicating that the user is a canonical driver or at least prefers to act as driver is counted.

In a further step, the obtained driver count is divided by the total number of trip data objects in said district. The resulting percentage value is in the following referred to as 'driver fraction' of a particular district.

Analogously, the fraction of trip data objects comprising the driver preference value indicating that the user is a canonical passenger or at least prefers to act as passenger is counted.

In a further step, the obtained count is divided by the total number of trip data objects in said district. The resulting percentage value is in the following referred to as 'passenger fraction' of a particular district.

Trip data objects comprising driver preference indicating that the corresponding user is likewise willing to act as driver and as passenger are considered neither as driver nor as passenger during the described calculation.

The calculated district specific driver fractions are used by the trip sharing service to generate a graphical representation of the geographic environment of a trip data object or a user, wherein the districts are assigned a particular color or matching according to their driver fractions.

For example districts wherein the driver fraction is in the range of 45 to 54% inclusive, the district is assigned a white color. In case the driver fraction is in the range of 55 to 64% inclusive, as the case in districts 1306 and 1303, a dotted hachure is assigned. In case the driver fraction of both districts is in the range of 35 to 44% inclusive, as the case in districts 1302 and 1304, the second hachure is assigned to the district. In case the driver fraction of both districts is in the range of 25 to 34% inclusive, as the case in district 1301, a third hachure is assigned to the district.

The graphic representation of different driver and passenger percentages in different districts provides multiple beneficial aspects to the operators as well as the users of the trip sharing service. The operator may use this information to create and distribute district specific advertisements addressing people acting preferentially as drivers or passengers to participate in the service. For example, if in a district too many drivers are registered, an advertisement campaign could be launched specifically addressing students or young people who often do not own a car on their own. In case too many passengers participate in the trip sharing service in a particular district, the operator of the trip sharing service may launch an advertisement campaign directed mainly against elder people or business customers who commonly own a car. The information may also be of value for third-party companies for addressing advertisement campaigns more specifically to particular districts having a high or low fraction of drivers.

According to a further beneficial aspect, each registered user of the trip sharing service is allowed to send an invitation to a person not yet being a registered user of the trip sharing service to join the community of registered trip sharing service users. Preferentially, but not necessarily so, the invitation is sent via e-mail. The invitation comprises a graphical representation of the driver fraction of a particular region selected by the inviting user. The graphic representation of the selected region is a map comprising multiple districts wherein the driver fraction of each district is encoded by a particular color or hachure as depicted in FIG. 13. Preferentially, the selected geographic region will be the home of the invited person. The invitation could comprise a text describing the functions and benefits of the trip sharing service and a map of the geographic region surrounding the home of the invited user as depicted in FIG. 13. Alternatively, or in addition, the invitation may comprise a geographic map being indicative of the average number of trip data objects in the global history covering pairs of starting locations and destinations within a particular time range. The map could, for example, depict said frequency values for the home town of the invited user. Assuming that the driving behavior of the trip sharing users in the past does not significantly deviate from the current driving behavior, said frequency is indicative of the probability that the invited user will find an appropriate trip accompany for a set of location pairs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Abbreviations

API Application Programming Interface
TS service Trip sharing service
TS server Trip sharing server
TSPR Trip series pattern recognition algorithm

| List of Reference Numerals | |
| --- | --- |
| 100 | type I processing devices |
| 101 | mobile phone |
| 102 | netbook/notebook |

List of Reference Numerals

| | |
|---|---|
| 103 | Smart phone |
| 104 | navigation device |
| 200 | type I processing device/client |
| 201 | trip data object |
| 202 | storage medium |
| 203 | first trip history |
| 204 | starting time, date and location |
| 205 | destination |
| 207 | first trip prediction algorithm |
| 208 | first TSPR algorithm |
| 210 | clock |
| 212 | processor |
| 213 | type interface for external data |
| 214 | interface for application data |
| 215 | interface for vehicle data |
| 216 | application |
| 217 | interface for exchanging data with trip sharing service |
| 300 | type II processing device |
| 400 | type II processing device/trip sharing server |
| 400 | interface for exchanging data with trip sharing service clients |
| 402 | storage medium |
| 403 | clock |
| 404 | processor |
| 405 | interface for external data |
| 406 | second trip history |
| 407 | nth trip history |
| 408 | nth trip prediction algorithm |
| 409 | nth TSPR algorithm |
| 410 | trip sharing service |
| 411 | global trip history |
| 500 | client device |
| 501 | trip prediction input parameters |
| 502 | current time and date |
| 503 | external data |
| 504 | current place |
| 505 | vehicle data |
| 506 | trip |
| 507 | trip |
| 508 | trip |
| 509 | trip |
| 510 | service request |
| 511 | trip sharing server |
| 512 | application data |
| 600 | client device |
| 601 | TSPR input parameters |
| 602 | current time and date |
| 603-605, 613-614 | set of trip data objects |
| 606 | trip history |
| 607-609 | predicted trip series |
| 610-612 | submitted servers request |
| 615-622 | set of identical predicted trips |
| 623-625 | predicted trips of trip series |
| 800-808 | steps |
| 810 | decision |
| 809 | method end |
| 812-814 | steps |
| 900-903 | steps |
| 905 | decision |
| 904 | method end |
| 906-907 | steps |
| 1000 | chart |
| 1050 | dimension |
| 1051 | dimension |
| 1052 | dimension |
| 1053 | vector |
| 1054 | vector |
| 1055 | vector |
| 1056 | vector |
| 1057 | ankle |
| 1058 | ankle |
| 1200 | server |
| 1201 | network interface |
| 1202 | trip sharing web service interface |
| 1203 | trip sharing service |
| 1204 | other service |
| 1205 | invitation service |
| 1206 | matching service |
| 1207 | user education service |
| 1208 | service request |
| 1209 | trip sharing database |
| 1300-1306 | districts |

What is claimed is:

1. A computer implemented method for allocating users as trip accompanies, the method comprising:

creating a first trip prediction algorithm, the first trip prediction algorithm being operable to predict future trips of a first user and being created by evaluating information on past trips of the first user, the information on past trips of the first user being stored in a first trip history, the first trip history comprising trip data objects representing past trips of the first user, each trip data object comprising at least the starting time, starting date, starting place and the destination of the past trip;

collecting, by a first processing device, input parameters, the input parameters comprising at least the current time and current date;

predicting, by the first trip prediction algorithm using the collected input parameters as input, at least one first trip;

for each predicted trip, calculating a prediction score, wherein the prediction score is calculated as a derivative value of an accuracy of the first trip prediction algorithm and a calculated probability value being indicative of a probability that the first user will indeed executed the predicted trip;

executing, by a trip sharing service, a matching method, the matching method comparing attributes of the predicted at least one first trip with attributes of at least one second trip, the at least one second trip belonging to a second user of the trip sharing service, the at least one first trip being represented by a first potential trip data object, the second trip being represented by a second potential trip data object, the matching resulting in the determination of a matching score for each pair of compared potential trip data objects;

allocating the first and the second user to each other as trip accompanies in dependence of the matching score of the first and second potential trip data object; and dynamically assigning driver and passenger roles to the users having been allocated to each other as the trip accompanies for a planned trip, wherein the assignment of the driver and passenger roles to the users depend on distribution of the driver and passenger roles in specific geographic regions.

2. The computer implemented method according to claim 1, wherein the first trip prediction algorithm is implemented as a neural network.

3. The computer implemented method according to claim 2, wherein the neural network is implemented as feed-forward back-propagation network, the network being trained on the first history, wherein the step of predicting the at least one first trip is established by selecting the at least one first trip from a set of known trips, the set of known trips being selected from the group consisting of trips derived from all trip data objects of the first history, and trips derived from all trip data objects of the first history and trips having been derived from a calendar application implicitly or explicitly specifying planned trips of the first user.

4. The computer implemented method according to claim 1, wherein the first trip prediction algorithm is based on a statistical approach, the statistical approach comprising the steps of
assigning each input parameter an input parameter type;
assigning each input parameter type a weight;
calculating, for each collected input parameter and for each known trip a probability value, the probability value being indicative of the probability that the known trip will be executed by the first user in the future given said input parameter, the set of known trips being selected from the group consisting of
trips derived from all trip data objects of the first history, and
trips derived from all trip data objects of the first history and trips having been derived from a calendar application implicitly or explicitly specifying planned trips of the first user;
calculating a total probability value for all known trips by weighting each probability value calculated for an input parameter value according to the weight assigned to the type of said parameter; and
summing up the weighted probabilities for each known destination calculated for the collected input parameter values.

5. The computer implemented method according to claim 1, wherein during the execution of the matching method one role is assigned dynamically to each of the first user and the at least one second user, wherein one of both users is assigned a driver role and the other user is assigned a passenger role, the role assignment depending on the preferences specified by each user, the preferences comprising a scale value indicating the preference of a user to act as driver or as passenger.

6. The computer implemented method according to claim 1, further comprising:
creating a first trip series pattern recognition algorithm, the first trip series pattern recognition algorithm being operable to predict future trips series of the first user and having being created by evaluating information on past trips of the first user, the information on past trips of the first user being stored in the first trip history;
collecting, by the first processing device, trip series pattern recognition input parameters for the trip series pattern recognition algorithm, the trip series pattern recognition input parameters comprising at least the current time and current date;
predicting, by the first trip series pattern recognition algorithm using the collected trip series pattern recognition input parameters as input, at least one first trip series.

7. The computer implemented method according to claim 6, wherein the predicted at least one trip series comprises a predicted third trip, further comprising:
transforming the predicted third trip into a third potential trip data object;
comparing, by the matching method, the third and the at least one second potential trip data object;
determining, during execution of the matching method, a matching score of the predicted third potential trip data object and the at least one second potential trip data object;
increasing said matching score if the second predicted trip belongs to a second predicted trip series of a second user and if in addition at least one further pair of potential trip data objects reaches a matching score above a threshold value, the at least one further pair of potential trip data objects comprising one predicted trip from the first predicted trip series and one potential trip data object from the second predicted trip series, wherein said increasing of the matching score results in a preferential allocation of users as trip accompanies who have been predicted by the trip series pattern recognition algorithm to share multiple future trip plans.

8. The computer implemented method according to claim 1, wherein the prediction score is calculated as the calculated probability that the first user will chose the predicted destination given the input parameters.

9. The computer implemented method according to claim 1, wherein the step of creating a first trip prediction algorithm, collecting input parameters and predicting at least one first trip are executed on a client device being operable to submit service requests to a remote trip sharing server, the method further comprising the following steps which are executed before the execution of the matching method on the trip sharing server is initiated:
creating, for the at least one first predicted future trip, a trip sharing service request, the created service request comprising at least the starting time, starting date and starting location and the destination of the predicted at least one first trip;
submitting the created trip sharing service request to the trip sharing server;
receiving the created trip sharing service request by the trip sharing service;
creating, by the trip sharing service, the first potential trip data object, the first potential trip data object comprising the starting time, starting date, starting location and destination specified in the received service request;
wherein during the execution of the matching method the first potential trip data object is compared against a plurality of existing second potential trip data objects, each second potential trip data object representing an explicitly defined or predicted future trip of at least one second user.

10. The computer implemented method according to claim 9, wherein the client device is selected from the group consisting of: a notebook, a netbook, a desktop computer, a mobile phone, a navigation device, and a smart phone.

11. The computer implemented method according to claim 1, wherein the step of creating a first trip prediction algorithm, collecting input parameters and predicting at least one first trip are executed on the trip sharing server being operable to receive service requests from trip sharing service clients, wherein the at least one predicted first trip is transformed into a first potential trip data object, the created first potential trip data object comprising at least the starting time and date, the starting location and the destination of the at least one first predicted trip, and wherein during the execution of the matching method the first potential trip data object is compared against a plurality of existing second potential trip data objects, each second potential trip data object representing an explicitly defined or predicted future trip of at least one second user.

12. The computer implemented method according to claim 11, wherein the first trip history of the first user is part of a global trip history, the global trip history comprising at least one second trip history of at least one second user, wherein at least a second trip prediction algorithm is derived from data contained in the at least one second trip history, and wherein the second potential trip data object is comprises at least the starting time, starting date, starting location and destination of a second predicted trip, the second predicted trip having been predicted by the second trip prediction algorithm.

13. The computer implemented method according to claim 11, further comprising the steps of
analyzing all trip data objects of the global history, thereby assigning trip data objects to a geographic region according to their starting place;
determining, for each geographic region, the fraction of drivers and passengers;
graphically representing the determined fractions of drivers and passengers in form of a map, wherein different driver fraction ranges in different geographic regions are displayed with different colors or by hachuring.

14. The computer implemented method according to claim 11, further comprising the steps of
analyzing all trip data objects of the global history, thereby determining a global set of location pairs, each location pair comprising a first and a second location, the first and second location of each location pair being derived from the starting point and destination of a trip data object;
determining, for a predefined or user-defined period of time and for each location pair of the global set of location pairs, the average number of trip data objects in the global trip history having the first location of the location pair as start location and the second location as destination, the determined number being a frequency value which indicates the probability to find a trip accompany for a trip having first location as starting location and second location as destination;
graphically representing the determined frequency values in form of a map, wherein different frequency ranges are displayed with different colors or by hachuring.

15. The computer implemented method according to claim 13, wherein the determined fraction of drivers and passengers for different geographic regions is used by the matching method to execute, when matching a first potential trip data object of a first user against a second potential trip data object of a second user a step, the step being selected from the group consisting of:
increasing a driver preference score value of the first user if the first potential trip data object has a starting place in a first geographic region wherein the driver fraction is lower than the driver fraction of the geographic region comprising the starting place of the second potential trip data object,
decreasing a driver preference score value of the first user if the first potential trip data object has a starting place in a first geographic region wherein the driver fraction is higher than the driver fraction of the geographic region comprising the starting place of the second potential trip data object, and
increasing the matching score of a pair of a first and a second potential trip data object, the first potential trip data object belonging to a first user and having a first geographic region as starting place, the second potential trip data object belonging to a second user and having a second geographic region as starting place, if the first user preferentially acts as driver, the second user preferentially acts as passenger, and the first geographic region has a higher driver fraction than the second geographic region,
thereby reducing the determined regional driver/passenger inequalities between different geographic regions.

16. The computer implemented method according to claim 9, wherein the comparison of the first potential trip data object with the at least one second potential trip data object is implemented as a comparison of multidimensional vectors, wherein a first multidimensional vector represents the first potential trip data object, a second multidimensional vector represents the second potential trip data object, the first and the second vector each comprise multiple dimensions, wherein each dimension has associated a weight, wherein each dimension represents an attribute of its represented potential trip data object, and wherein the comparison of the first and the second vector comprises a comparison of the angle of both vectors in a multi-dimensional space and wherein the weight of each dimension determines the impact of the corresponding dimension on the result of the comparison.

17. The computer implemented method according to claim 1, wherein the collected input parameters in addition comprise parameters being selected from the group consisting of data provided by external service or data providers, vehicle data, the current position of the processing device, and application data.

18. A data processing system comprising a server hosting a trip sharing service and at least a first client device of a first user, the server and the first client device being operable of communicating with one another, the first client device being capable to submit a first service request to the service, the server being capable to generate a result in response to the first service request and to return the result to the first client device,
the first client device comprising:
a processor;
an interface for connecting the client device to a network and for exchanging data with the server;
a computer readable non-transitory storage medium stored thereon instructions that when executed by the processor of the client device cause the processor to submit a service request to the trip sharing service, the service request comprising at least the starting time and date, the starting place and destination of a first predicted trip of the first user, the first predicted trip being predicted by a first trip prediction algorithm, the first trip prediction algorithm taking at least the current time and date determined by the clock as input for predicting the first trip, the first trip prediction algorithm having been created based on data of past trips of the first user being stored to a first trip history, wherein each past trip in the first trip history is represented as trip data object comprising at least the starting time, starting date, starting location and destination of the past trip; the first trip prediction algorithm, for each trip, calculating a prediction score, wherein the prediction score is calculated as a derivative value of an accuracy of the first trip prediction algorithm and a calculated probability value being indicative of a probability that the first user will indeed executed the predicted trip; wherein the server further comprising:
a processor;
a network interface for connecting the server to a network ant for exchanging data with at least one client;
a computer readable non-transitory storage medium stored thereon instructions that when executed by a processor of the server cause the processor to perform a trip sharing service,
wherein the trip sharing service in operation transforms the service request received from the first client device into a first potential trip data object, executes a matching method comparing attributes of the predicted first trip with attributes of at least one second trip, the at least one second trip belonging to a second user of the trip sharing service, the second trip being represented by a second potential trip data object, the matching resulting in the determination of a matching score for each pair of compared trips and in the assignment of the first and the second user to each other as trip accompanies, dynamically assigning driver and passenger roles to the user having been allocated to each other as the trip accompanies for a planned trip, wherein the assignment of the driver and passenger roles to the users depend on distribution of the driver and passenger roles in specific geographic regions.

19. The data processing system according to claim 18, wherein the non-transitory storage medium of the client further comprises instructions for executing a first trip series pattern recognition algorithm, the first trip series pattern recognition algorithm being operable to predict future trips series of the first user and having being created by evaluating information on past trips of the first user, the information on past trips of the first user being stored in the first trip history.

20. A computer-readable non-transitory storage medium stored thereon instructions that when executed by a processor cause the processor to perform a method for allocating users as trip accompanies, the method comprising:

creating a first trip prediction algorithm, the first trip prediction algorithm being operable to predict future trips of a first user and being created by evaluating information on past trips of the first user, the information on past trips of the first user being stored in a first trip history comprising trip data objects, each past trip being represented by a trip data object, each trip data object comprising at least the starting time, starting date, starting place and the destination of the past trip;

collecting, by a first processing device, input parameters for the trip prediction algorithm, the input parameters comprising at least the current time and date;

predicting, by the first trip prediction algorithm using the collected input parameters as input, at least one first trip;

for each predicted trip, calculating a prediction score, wherein the prediction score is calculated as a derivative value of an accuracy of the first trip prediction algorithm and a calculated probability value being indicative of a probability that the first user will indeed executes the predicted trip;

executing, by a trip sharing service, a matching method, the matching method comparing attributes of the predicted at least one first trip with attributes of at least one second trip, the at least one second trip belonging to a second user of the trip sharing service, the at least one first trip being represented by a first potential trip data object, the second trip being represented by a second potential trip data object, the matching resulting in the determination of a matching score for each pair of compared trips;

allocating the first and the second user to each other as trip accompanies; and dynamically assigning driver and passenger roles to the users having been allocated to each other as the trip accompanies for a planned trip, wherein the assignment of the driver and passenger roles to the users depend on distribution of the driver and passenger roles in specific geographic regions.

* * * * *